US010097529B2

(12) United States Patent
Kang et al.

(10) Patent No.: US 10,097,529 B2
(45) Date of Patent: Oct. 9, 2018

(54) SEMICONDUCTOR DEVICE FOR CONTROLLING ACCESS RIGHT TO SERVER OF INTERNET OF THINGS DEVICE AND METHOD OF OPERATING THE SAME

(71) Applicant: SAMSUNG ELECTRONICS CO., LTD., Suwon-si, Gyeonggi-do (KR)

(72) Inventors: Bo Gyeong Kang, Seoul (KR); Sang Hwa Jin, Seongnam-si (KR); Dong Jun Shin, Hwaseong-si (KR); Myung Koo Kang, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 222 days.

(21) Appl. No.: 15/142,001

(22) Filed: Apr. 29, 2016

(65) Prior Publication Data

US 2016/0323257 A1 Nov. 3, 2016

Related U.S. Application Data

(60) Provisional application No. 62/155,627, filed on May 1, 2015, provisional application No. 62/215,386, filed on Sep. 8, 2015.

(30) Foreign Application Priority Data

Sep. 4, 2015 (KR) .......................... 10-2015-0125821

(51) Int. Cl.
H04L 29/06 (2006.01)
H04L 29/08 (2006.01)

(52) U.S. Cl.
CPC .......... *H04L 63/08* (2013.01); *H04L 63/0428* (2013.01); *H04L 63/10* (2013.01); *H04L 67/12* (2013.01)

(58) Field of Classification Search
CPC ...................................................... H04L 63/08
USPC ............................................................ 726/4
See application file for complete search history.

(56) References Cited

U.S. PATENT DOCUMENTS

| 8,020,197 | B2 | 9/2011 | Shiran et al. |
| 8,495,729 | B2 | 7/2013 | Park |
| 8,532,304 | B2 | 9/2013 | Asokan et al. |
| 2009/0081999 | A1* | 3/2009 | Khasawneh ............ H04M 3/56 455/416 |

(Continued)

FOREIGN PATENT DOCUMENTS

| JP | 2007-293811 | 11/2007 |
| JP | 2009-302681 | 12/2009 |

(Continued)

*Primary Examiner* — Jacob Lipman
(74) *Attorney, Agent, or Firm* — F. Chau & Associates, LLC

(57) ABSTRACT

A method of operating a hub which authenticates a plurality of IoT devices between a server and the IoT devices in place of the server includes authenticating a first IoT device using one of a plurality of predetermined pairing authentication techniques upon receiving a pairing request from the first IoT device, sending a request for an access right of the first IoT device to the server based on pairing information of the first IoT device and transmitting data of the first IoT device to the server upon receiving approval of the access of right of the first IoT device.

20 Claims, 20 Drawing Sheets

(56) References Cited

U.S. PATENT DOCUMENTS

2012/0096503 A1* 4/2012 Slothouber ........ H04N 21/4126
  725/110
2012/0331286 A1 12/2012 Choi et al.
2015/0007283 A1 1/2015 Brugger et al.
2015/0012977 A1 1/2015 Huh et al.

FOREIGN PATENT DOCUMENTS

JP   2014-175698   9/2014
KR   1020140028238  3/2014

* cited by examiner

FIG. 3

| TYPE | Authentication Technique |
|---|---|
| TYPE 1 | SSID(Service Set IDentifier) Authentication |
| | WEP(Wired Equivalent Privacy) Key Authentication |
| | PAP(Password Authentication Protocol) Authentication |
| | RFID(Radio Frequency IDentification) Authentication |
| TYPE 2 | MAC(Media Access Control) Address Authentication |
| TYPE 3 | IEEE 802.1x Authentication |
| | IEEE 802.11i Authentication |
| | WPA(Wi-Fi Protected Access) Authentication |
| TYPE 4 | Digital Signature Authentication |
| TYPE 5 | IBE(ID-Based Encryption) Authentication |
| | Biometrics-Based Authentication |
| TYPE 6 | Spatial Authentication |
| | Signal Strength Authentication |
| | Response Speed Authentication |

SEMICONDUCTOR DEVICE FOR CONTROLLING ACCESS RIGHT TO SERVER OF INTERNET OF THINGS DEVICE AND METHOD OF OPERATING THE SAME

CROSS-REFERENCE TO RELATED APPLICATIONS

This application claims priority under 35 U.S.C. § 119(e) to U.S. provisional patent application No. 62/155,627 filed on May 1, 2015, and 62/215,386 filed on Sep. 8, 2015 and under 35 U.S.C. § 119(a) to Korean Patent Application No. 10-2015-0125821 filed on Sep. 4, 2015, the entire disclosure of each are incorporated by reference herein.

BACKGROUND

1. Technical Field

Embodiments of the inventive concept relate to a semiconductor device, and more particularly, to a semiconductor device for managing and controlling an access right to a server for an internet of things (IoT) device and a method of operating the same.

2. Discussion of Related Art

The IoT is a network of physical objects ("things") embedded with electronics, software, sensors, and network connectivity (e.g., connectivity to the Internet), which enables these objects to collect and exchange data. As an example, the things can be embedded systems such as home appliances, mobile and wearable devices. A thing of the IOT (e.g., an IOT device) may have a unique Internet Protocol (IP) address to identify itself when it is connected to the Internet and include an embedded sensor to obtain data from an external environment.

When an IoT device is used by a malicious user in an IoT network system, the IoT network system may be badly damaged. However, since the level of security and authentication is different among IoT devices, it can be difficult maintain security.

SUMMARY

According to an exemplary embodiment of the inventive concept, there is provided a semiconductor device including a communication module configured to receive a pairing request from an internet of things (IoT) device and a processor configured to communicate with the communication module. The processor selects an authentication technique from among a plurality of predetermined pairing authentication techniques in response to the pairing request, authenticates the IoT device using the selected authentication technique, controls the communication module for pairing with the IoT device, sends a request for an access right of the IoT device to a server based on pairing information of the IoT device, and transmits data of the IoT device to the server upon receiving approval of the access right from the server.

The processor may transmit authentication information of the semiconductor device to the server together with the pairing information of the IoT device when sending the request for the access right.

The authentication information of the semiconductor device may include a media access control (MAC) address, a digital signature, or an ID-based encryption (IBE)-related signal.

The processor may generate a data sheet by processing data received from a plurality of IoT devices into a data format predefined between the server and the semiconductor device and may transmit the data sheet to the server together with the authentication information of the semiconductor device.

The semiconductor device may further include a hardware secure module configured to store the predetermined pairing authentication techniques. The processor may select the authentication technique using an authentication request signal included in the pairing request and the predetermined pairing authentication techniques stored in the hardware secure module.

According to an exemplary embodiment of the inventive concept, there is provided a method of operating a hub which authenticates a plurality of IoT devices between a server and the IoT devices in place of the server. The method includes authenticating a first IoT device using one of a plurality of predetermined pairing authentication techniques upon receiving a pairing request from the first IoT device, sending a request for an access right of the first IoT device to a server based on pairing information of the first IoT device, and transmitting data of the first IoT device to the server upon receiving approval of the access right of the first IoT device.

The method may further include completing pairing with the first IoT device and receiving the data of the first IoT device from the first IoT device after the receiving the approval of the access right.

Alternatively, the method may further include completing pairing with the first IoT device and receiving the data of the first IoT device from the first IoT device before receiving the approval of the access right.

The method may further include authenticating a second IoT device using one of the predetermined pairing authentication techniques upon receiving a pairing request from the second IoT device, sending a request for an access right to the server based on pairing information of the second IoT device, and transmitting data of the second IoT device to the server upon receiving approval of the access right of the second IoT device.

The data of the first IoT device and the data of the second IoT device may be transmitted to the server together with authentication information of the hub.

The transmitting the data of the second IoT device to the server may include generating a data sheet by processing the data of the first IoT device and the data of the second IoT device into a data format predefined between the server and the hub and transmitting the data sheet to the server together with authentication information of the hub.

According to an exemplary embodiment of the invention, a semiconductor device includes a wireless transceiver and a processing circuit. The wireless transceiver is configured to receive a pairing request from an internet of things (IoT) device. The processing circuit is configured to authenticate the IoT device using one of a plurality of pairing authentication techniques stored within the semiconductor device, send a request to a server for the IoT device to access the server upon authenticating the pairing request, and transmit data of the IoT device to the server upon receiving a response to the request from the server granting approval of the request.

In an embodiment, the semiconductor device further includes a secure hardware module configured to encrypt pairing information of the IoT device. In an embodiment, the processing circuit authenticates the request using the encrypted pairing information.

BRIEF DESCRIPTION OF THE DRAWINGS

The inventive concept will become more apparent by describing in detail exemplary embodiments thereof with reference to the attached drawings in which:

FIG. 3 is a diagram of pairing authentication techniques used in a secure module illustrated in FIG. 1;

DETAILED DESCRIPTION

Figure 1:
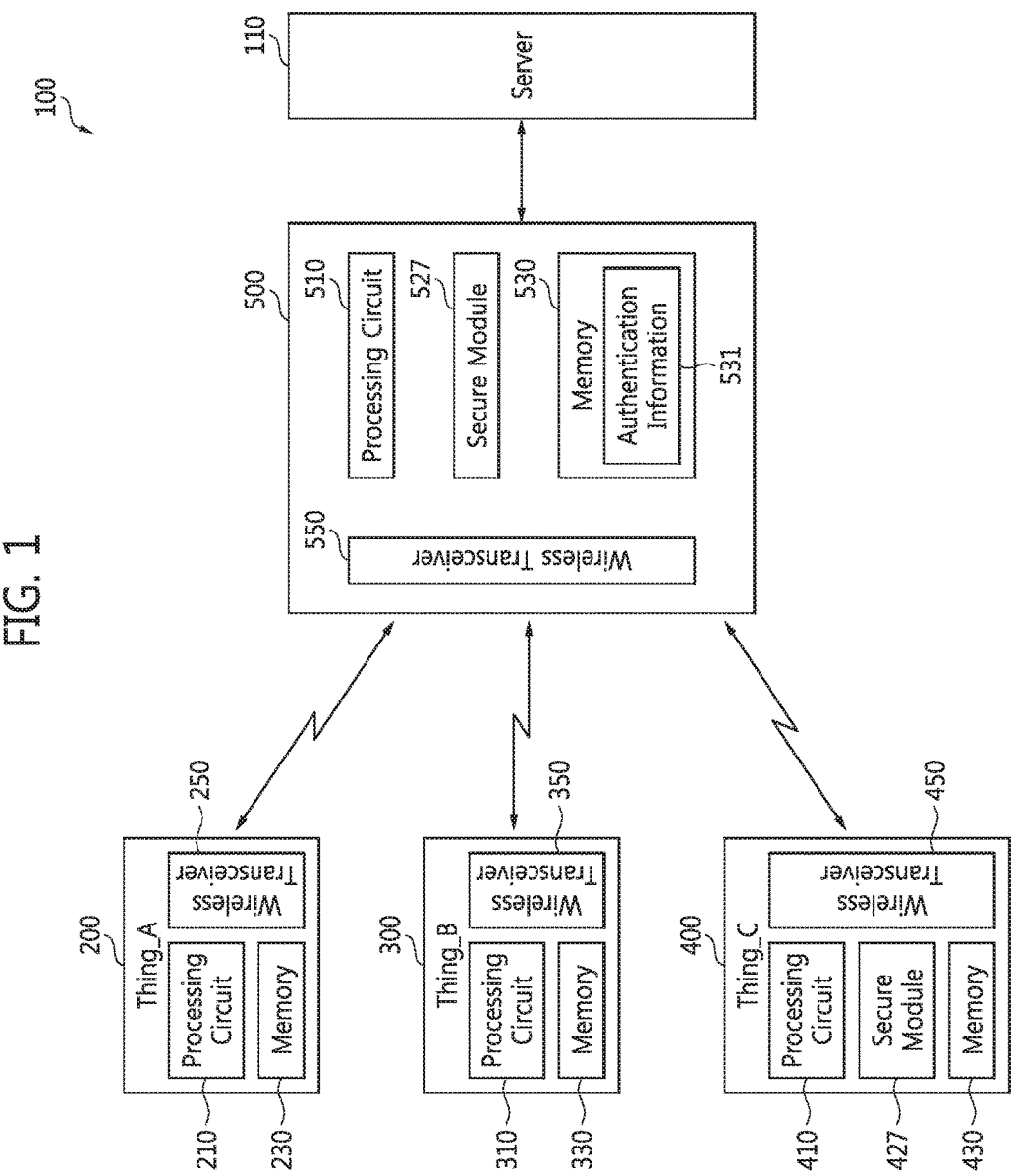
FIG. 1 is a block diagram of a data processing system according to an exemplary embodiment of the inventive concept.

The inventive concept now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. As used herein, the singular forms "a", "an" and "the" are intended to include the plural forms as well, unless the context clearly indicates otherwise.

Pairing is a procedure for registering information (e.g., pairing information) associated with a second device in a first device in order to wirelessly connect the second device (e.g., an internet of thing (IoT) device) to the first device (e.g., a master device or a hub). Hereinafter, pairing for authentication may be referred to as pairing authentication. Once the first device and the second devices are paired with each other, no more pairing may be necessary between the first and second devices since the pairing information of the second device has been registered in the first device. However, when the pairing information of the second device is deleted from the first device, pairing between the first device and second device may need to be performed again.

It is assumed that a thing collectively refers to an integrated circuit (IC), a semiconductor device, a semiconductor package, an electronic device, or an IoT device. The semiconductor device may be implemented as a module or a system in package (SiP).

Figure 2:
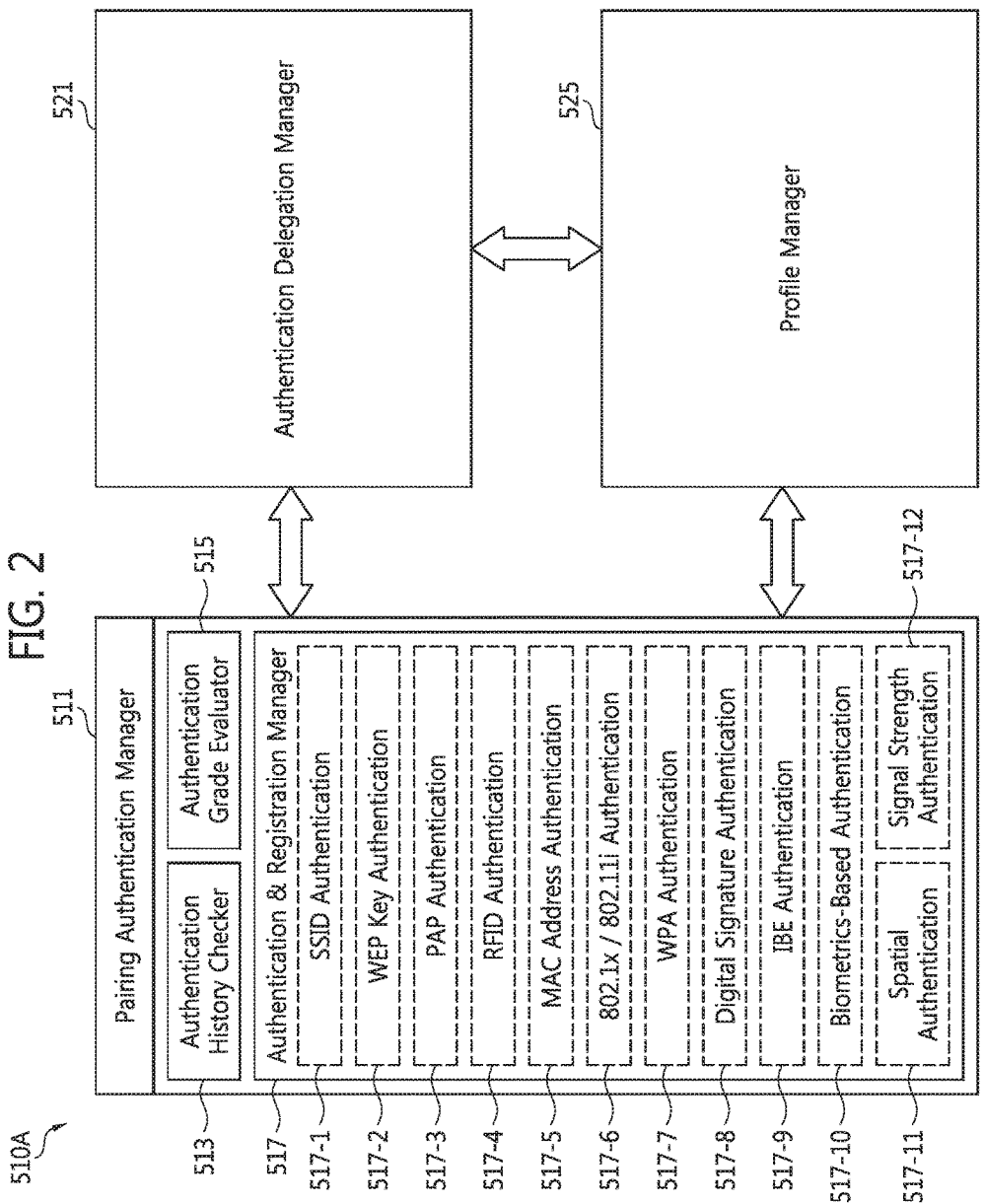
FIG. 2 is a block diagram of a processing module illustrated in FIG. 1 according to an exemplary embodiment of the inventive concept.

FIG. 1 is a block diagram of a data processing system 100 according to an exemplary embodiment of the inventive concept. FIG. 2 is a block diagram of an example 510A of a processing module 510 illustrated in FIG. 1. Referring to FIGS. 1 and 2, the data processing system 100 may include a plurality of internet of things (IoT) devices 200, 300, and 400, at least one hub 500, and a server 110.

It is assumed that the first IoT device 200 is a device (or a thing) connected to the hub 500 without security authentication, the second IoT device 300 is a device (or a thing) connected to the hub 500 with limited security authentication, and the third IoT device 400 is a device (or a thing) connected to the hub 500 using a security authentication platform. The security level of the second IoT device 300 is higher than that of the first IoT device 200 and the security level of the third IoT device 400 is higher than that of the second IoT device 300. The third IoT device 400 and the hub 500 may use the security platform provided on https://www.artik.io/, but the inventive concept is not limited thereto. For example, the security platform may be SAMSUNG ARTIK.

As described above, each of the devices 200, 300, 400, and 500 may be implemented as an IoT device, but the inventive concept is not limited thereto. The IoT device, which will be described hereinafter, may include an accessible interface (e.g., a wired interface and/or a wireless interface). The IoT device may refer to a device which can communicate data (via wired or wireless connection) with at least one electronic device (or another IoT device) using the accessible interface.

The accessible interface may include a local area network (LAN), a wireless LAN (WLAN) like wireless fidelity (Wi-Fi), a wireless personal area network (WPAN) like Bluetooth, a wireless universal serial bus (USB), ZigBee, near field communication (NFC), radio-frequency identification (RFID), or a mobile cellular network, but the inventive concept is not limited thereto. The mobile cellular network may include a third generation (3G) mobile cellular network, a fourth generation (4G) mobile cellular network, a long term evolution (LTE™) mobile cellular network, or an LTE-advanced (LTE-A) mobile cellular network, but the inventive concept is not limited thereto.

The first IoT device 200 includes a processing circuit 210, a memory 230, and a communication module 250. The processing circuit 210 may control the memory 230 and the communication module 250. The processing circuit 210 may be an integrated circuit (IC), a processor, or a central processing unit (CPU). The processing circuit 210 may communicate a command and/or data for pairing with the hub 500 through the communication module 250. When the first IoT device 200 includes at least one sensor, the processing circuit 210 may process a signal detected by the sensor and may transmit the processed signal to the hub 500 through the communication module 250.

The memory 230 may store data which has been processed or will be processed by the processing circuit 210 or the communication module 250. The communication module 250 may communicate a command and/or data with the hub 500 according to the control of the processing circuit 210. The communication module 250 may be a wireless transceiver and may communicate with the hub 500 through the above-described accessible interface.

The second IoT device 300 includes a processing circuit 310, a memory 330, and a communication module 350. The processing circuit 310 may control the memory 330 and the communication module 350. The processing circuit 310 may be an IC, a processor, or a CPU. The processing circuit 310 may communicate a command and/or data for pairing with the hub 500 through the communication module 350. When the second IoT device 300 includes at least one sensor, the processing circuit 310 may process a signal detected by the sensor and may transmit the processed signal to the hub 500 through the communication module 350.

The memory 330 may store data which has been processed or will be processed by the processing circuit 310 or the communication module 350. The communication module 350 may communicate a command and/or data with the hub 500 according to the control of the processing circuit 310. The communication module 350 may be a wireless transceiver and may communicate with the hub 500 through the above-described accessible interface.

The third IoT device 400 includes a processing circuit 410, a secure module 427, a memory 430, and a communication module 450. The processing circuit 410 may control the secure module 427, the memory 430, and the communication module 450. The processing circuit 410 may be an IC, a processor, or a CPU. The processing circuit 410 may communicate a command and/or data for pairing with the hub 500 through the communication module 450. The secure module 427 may be a hardware secure module and may convert data (e.g., unencrypted data) which has been processed or will be processed by the processing circuit 410 into secure data (e.g., encrypted data). The secure module 427 may also convert data (e.g., unencrypted data) which has been processed or will be processed by the communication module 450 into secure data (e.g., encrypted data).

When the third IoT device 400 includes at least one sensor, the processing circuit 410 may process a signal detected by the sensor and may transmit the processed signal to the hub 500 through the communication module 450. At this time, the secure module 427 may convert data to be transmitted to the communication module 450 into secure data.

The memory 430 may store data which has been processed or will be processed by the processing circuit 410 or the communication module 450. The communication module 450 may communicate a command and/or data with the hub 500 according to the control of the processing circuit 410. The communication module 450 may be a wireless transceiver and may communicate with the hub 500 through the above-described accessible interface.

The hub 500 may include a processing circuit 510, a memory 530, a secure module 527, and a communication module 550. The processing circuit 510 may control the secure module 527, the memory 530, and the communication module 550. The processing circuit 510 may be an IC, a processor, or a CPU. The processing circuit 510 may communicate a command and/or data for pairing with each of the IoT devices 200, 300, and 400 through the communication module 550. The secure module 527 may be a hardware secure module and may convert data (e.g., unencrypted data) processed or to be processed by the processing circuit 510 into secure data (e.g., encrypted data). The secure module 527 may also convert data (e.g., unencrypted data) processed or to be processed by the communication module 550 into secure data (e.g., encrypted data).

The memory 530 may store data which has been processed or will be processed by the processing circuit 510, the secure module 527, or the communication module 550. The memory 530 may include a secure region (or a secure memory) (not shown) which stores the secure data and a non-secure region (or a non-secure memory) (not shown) which stores non-secure data. The memory 530 may store authentication information 531 as the secure data. The authentication information 531 may include pairing information with respect to each of the IoT devices 200, 300, and 400. The authentication information 531 may also include authentication information (such as a media access control (MAC) address, a digital signature, or a signal related with ID-based encryption (IBE)) of the hub 500.

Each of the memories 230, 330, 430, and 530 may be formed of volatile or non-volatile memory. The memories 230, 330, 430, and 530 may be embedded in or removable from the devices 200, 300, 400, and 500, respectively. Each of the memories 230, 330, 430, and 530 may be implemented as a hard disk drive (HDD), a solid state drive (SSD), a universal flash storage (UFS), or an embedded multimedia card (eMMC), but the inventive concept is not limited thereto.

The communication module 550 may communicate a command and/or data with the each of the IoT devices 200, 300, and 400 according to the control of the processing circuit 510. The communication module 550 may be a wireless transceiver and may communicate with the IoT devices 200, 300, and 400 through the above-described accessible interface.

The processing module 510A may include a pairing authentication manager 511, an authentication delegation manager 521, and a profile manager 525. In an exemplary embodiment, the pairing authentication manager 511 receives a pairing request from one or more of the IoT devices 200, 300, or 400; selects an authentication technique from among predetermined pairing authentication techniques (or methods) based on the pairing request; and performs a pairing with the corresponding one or more IoT devices 200, 300, or 400 using the selected authentication technique.

The elements 511, 521, and 525 may be implemented as hardware components (e.g., a circuit) or as software components executed in the processing circuit 510. Alternatively, some of the elements 511, 521, and 525 may be implemented as hardware components and the others may be implemented as software components.

The pairing authentication manager 511 controls or manages pairing with each of the IoT devices 200, 300, and 400. In an embodiment, the pairing authentication manager 511 checks an authentication history in response to a pairing request output from each of the IoT devices 200, 300, and 400; performs authentication using a pairing authentication technique appropriate to each IoT device 200, 300, or 400 when there is no authentication history; and controls or manages storing of the authentication result. The authentication result may be stored in the processing circuit 510 or the secure region of the memory 530, but the inventive concept is not limited thereto. The pairing authentication manager 511 may include an authentication history checker 513, an authentication grade evaluator 515, and an authentication and registration manager 517. In an embodiment, the authentication history indicates the particular authentication technique that was last used to authenticate one of the IoT devices.

In an embodiment, the authentication history checker 513 checks the access history and/or authentication information of one or more of the IoT devices 200, 300, or 400 that requests an access or pairing. For example, the authentication history checker 513 may check the access history and/or authentication information of the IoT device 200, 300, or 400 using the authentication information 531 stored in the memory 530. In an embodiment, the authentication and registration manager 517 performs authentication and storing of authentication information with respect to one or more of the IoT devices 200, 300, or 400 that has requested access or pairing.

FIG. 3 is a diagram of pairing authentication techniques used in the secure module 527 illustrated in FIG. 1. Referring to FIGS. 1 and 3, there are many types TYPE1 through TYPE6 of predetermined pairing authentication techniques, as shown in FIG. 3. Information about the predetermined pairing authentication techniques may be stored in the secure module 527 or the secure region of the memory 530, but the inventive concept is not limited thereto.

The first type TYPE1 is identifier/password-based authentication and may include a service set identifier (SSID) authentication technique 517-1, a wired equivalent privacy (WEP) key authentication technique 517-2, a password authentication protocol (PAP) authentication technique 517-3, and an RFID authentication technique 517-4, but it is not limited thereto. The second type TYPE2 may be a MAC address-based authentication technique 517-5 but is not limited thereto. The third type TYPE3 is a code protocol-based authentication and may include an IEEE 802.1x/802.11i authentication technique 517-6, a Wi-Fi protected access (WPA) authentication technique 517-7, and a WPA2 authentication technique but is not limited thereto.

The fourth type TYPE4 is certificate-based authentication including a digital signature authentication technique 517-8 but is not limited thereto. The fifth type TYPE5 may include an IBE-based authentication technique 517-9 and a biometric-based authentication technique 517-10 but is not limited thereto. The sixth type TYPE6 may include a spatial authentication technique 517-11, a signal strength authentication technique 517-12, and a response speed authentication technique but is not limited thereto.

The authentication and registration manager 517 selects one of the pairing authentication techniques 517-1 through 517-12 using an authentication request signal included in a pairing request output from the IoT device 200, 300, or 400; and may store authentication information associated with the selected authentication technique in the processing circuit 510 or the secure region of the memory 530. However, the inventive concept is not limited to the current embodiments. The authentication request signal may include at least one of an ID, a password, a MAC address, a WPA-related signal, a WPA2-related signal, a digital signature, an IBE-related signal, and a biometrics-related signal.

For example, the authentication request signal may include a signal strength of one of the IoT devices 200, 300, or 400; position information of one of the IoT devices 200, 300, or 400; or a response speed of one of the IoT devices 200, 300, or 400. The position information of one of the IoT devices 200, 300, or 400 may be generated based on satellite signals received by a global positioning system (GPS) receiver (not shown) included in a corresponding one of the IoT devices 200, 300, or 400. The response speed may be calculated by the hub 500 based on a response signal output from a corresponding one of the IoT devices 200, 300, or 400 after the hub 500 outputs a particular signal to the corresponding one of the IoT devices 200, 300, or 400. The authentication and registration manager 517 may select one of the pairing authentication techniques 517-1 through 517-12 based on the signal strength, position information or response speed of the corresponding one of the IoT devices 200, 300, or 400.

The authentication grade evaluator 515 may evaluate the authentication grade of one or more of the IoT devices 200, 300, or 400 using the authentication technique selected by the authentication and registration manager 517. For example, the authentication grade evaluator 515 may evaluate the authentication grade of the first IoT device 200 as a first grade, the authentication grade of the second IoT device 300 as a second grade higher than the first grade, and the authentication grade of the third IoT device 400 as a third grade higher than the second grade, but the inventive concept is not limited to this example. The authentication grade evaluator 515 may store the evaluated grade of each of the IoT devices 200, 300, and 400 in the secure module 527 or the secure region of the memory 530, but the inventive concept is not limited thereto. For example, the third grade being higher than the second grade may indicate the third IoT device 400 is more secure than the second IoT device 300, and the second grade being higher than the first grade may indicate the second IoT device 300 is more secure than the first IoT device 200.

The authentication delegation manager 521 requests an access right to a server of each of the IoT devices 200, 300, and 400 based on the pairing information of the IoT devices 200, 300, and 400 on behalf of each of the IoT devices 200, 300, and 400 and obtains approval for the access right for the corresponding IoT devices 200, 300, or 400. In an embodiment, the server of an IoT device refers to an external server (e.g., 110) that the IoT device is in communication with.

The profile manager 525 may manage and control the authentication information 531. In detail, the profile manager 525 may register, change, or remove the information of each of the IoT devices 200, 300, and 400, such as the access history, authentication information and authentication grade of the corresponding IoT devices 200, 300, and 400.

Figure 4:
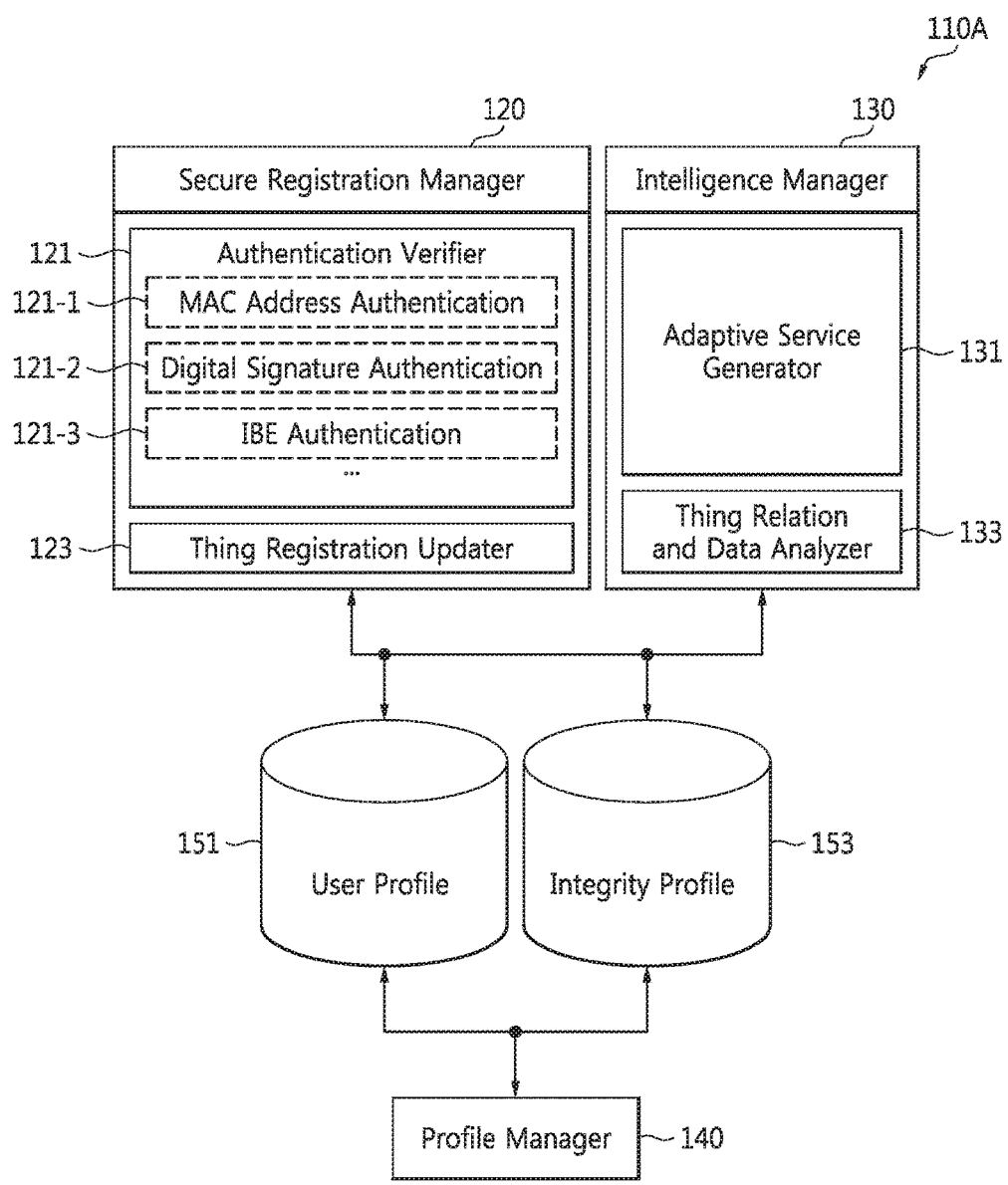
FIG. 4 is a block diagram of a server illustrated in FIG. 1 according to an exemplary embodiment of the inventive concept.

FIG. 4 is a block diagram of an example 110A of the server 110 illustrated in FIG. 1. Referring to FIG. 4, the server 110A includes a secure registration manager 120, an intelligence manager 130, a profile manager 140, a user profile 151, and an integrity profile 153.

The secure registration manager 120 authenticates the hub 500 and manages the access right and registration of each of the IoT devices 200, 300, and 400. The secure registration manager 120 may include an authentication verifier 121 and a thing registration updater 123.

The authentication verifier 121 receives an access right request signal including the pairing information of one or more of the IoT devices 200, 300, or 400 from the hub 500. The access right request signal may also include the authentication information of the hub 500 as well as the pairing information of the corresponding IoT devices 200, 300, or 400. The authentication information of the hub 500 may include a MAC address, a digital signature, or an IBE-related signal, but the inventive concept is not limited thereto.

The authentication verifier 121 selects an authentication technique appropriate to the hub 500 from among a plurality of hub authentication techniques 121-1 through 121-3 and performs authentication of the hub 500. When the authentication verifier 121 has succeeded in authenticating the hub 500, the authentication verifier 121 may approve the access right of a corresponding one of the IoT devices 200, 300, or 400 based on the pairing information of the corresponding one of the IoT devices 200, 300, or 400 included in the access right request signal. The authentication verifier 121 may approve the access right of the corresponding one of the IoT devices 200, 300, or 400 requested by the hub 500 without individual authentication of the corresponding one of the IoT devices 200, 300, or 400 once it successfully authenticates the hub 500.

Alternatively, the authentication verifier 121 may selectively approve the access right of the corresponding one of the IoT devices 200, 300, or 400 requested by the hub 500 based on the authentication of the hub 500 and the pairing information of the IoT device 200, 300, or 400. For instance, the authentication verifier 121 may selectively approve the access right of the corresponding one of the IoT devices 200, 300, or 400 requested by the hub 500 according to at least one among the authentication method, authentication grade and authentication history of the corresponding one of the IoT devices 200, 300, or 400, which are included in the pairing information of the corresponding one of the IoT devices 200, 300, or 400.

As described above, when the hub 500 accesses the server 110A using a predetermined secure authentication platform (e.g., the secure platform provided on https://www.artik.io/ or a secure platform such as SAMSUNG ARTIK), the server 110A may trust the hub 500 due to confidence in the hub 500, and thus may approve the access right of the corresponding one of the IoT devices 200, 300, or 400 requested by the hub 500. Accordingly, an IoT device which does not use the secure authentication platform, for example, an IoT device connected to the hub 500 using limited secure authentication, or even an IoT device connected to the hub 500 without secure authentication can be granted a right to access (e.g., an access right) the server 110A through the hub 500.

When the access right of a corresponding one of the IoT devices 200, 300, or 400 is approved by the authentication verifier 121; the thing registration updater 123 may register the corresponding one of the IoT devices 200, 300, or 400 in the user profile 151 using the pairing information of the corresponding one of the IoT devices 200, 300, or 400. The thing registration updater 123 controls and manages the registration, change, and removal of the IoT devices 200, 300, and 400.

When the authentication verifier 121 sends the approval of the access right of a corresponding one of the IoT devices 200, 300, or 400 to the hub 500; the hub 500 completes the pairing with the corresponding one of the IoT devices 200, 300, or 400, receives data from the corresponding one of the IoT devices 200, 300, or 400 (e.g., the paired device), and transmits the data from the corresponding one of the IoT devices 200, 300, or 400 to the server 110A. Then, the thing registration updater 123 registers the data of the corresponding one of the IoT devices 200, 300, or 400 (e.g., the paired device) in the user profile 151.

The thing registration updater 123 may store the information and data of the IoT devices 200, 300, and 400 in the user profile 151 by homes, hubs, or clusters. The thing registration updater 123 may determine the cluster type of one or more of the IoT devices 200, 300, or 400 as one of a plurality of cluster types according to the information and/or data of the one or more IoT devices 200, 300, or 400. For example, the thing registration updater 123 may classify a device connected to the hub 500 without secure authentication as a first cluster type, a device connected to the hub 500 using limited secure authentication as a second cluster type, and a device connected to the hub 500 using a secure authentication platform as a third cluster type. For example, the thing registration updater 123 may classify IoT devices such as sensors and home gadgets as the first cluster type, IoT devices such as smart television (TV) and smart phones as the second cluster type, and IoT devices such as smart home appliances as the third cluster type. Alternatively, the hub 500 may determine the cluster type of the IoT devices 200, 300, and 400 as one of a plurality of cluster types and may inform the server 110A of the determined cluster type.

The intelligence manager 130 analyzes IoT data stored in the user profile 151 to generate an analysis result and supports a service to be provided based on the analysis result. The intelligence manager 130 may include an adaptive service generator 131 and a thing relation and data analyzer 133.

The thing relation and data analyzer 133 may collectively analyze the data of the IoT devices 200, 300, and 400 (e.g., the things) to generate analyzed information and compute a relationship between the things from the analyzed information. The analyzed information and the relationship between the things which have been computed by the thing relation and data analyzer 133 may be stored in the integrity profile 153.

The adaptive service generator 131 may generate or support a service based on the data stored in the integrity profile 153. The profile manager 140 may manage and control the user profile 151 and the integrity profile 153.

Figure 5:
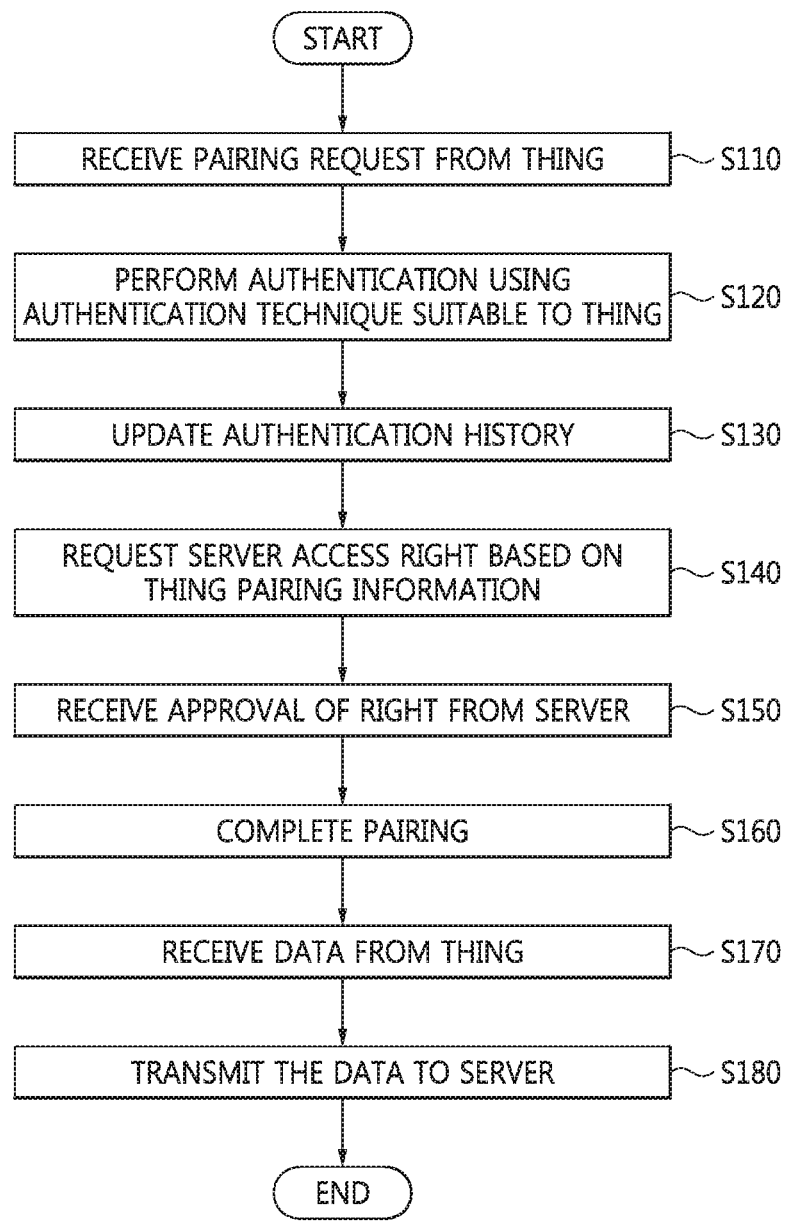
FIG. 5 is a flowchart of a method of operating a hub according to an exemplary embodiment of the inventive concept.

FIG. 5 is a flowchart of a method of operating the hub 500 according to an exemplary embodiment of the inventive concept. Referring to FIGS. 1 through 3 and FIG. 5, the hub 500 receives a pairing request from one of the IoT devices 200, 300, or 400 in operation S110. The pairing request may be a signal sent by the corresponding IoT device to the hub 150. The hub 500 performs authentication of the corresponding one of the IoT devices 200, 300, or 400 using one of the predetermined authentication techniques in operation S120.

For example, the hub 500 may select an authentication technique from among a plurality of authentication techniques using an authentication request signal included in the pairing request from the corresponding one of the IoT devices 200, 300, or 400 and may authenticate the corresponding one of the IoT devices 200, 300, or 400 using the selected authentication technique. The authentication request signal may include an ID, a password, a MAC address, a WPA-related signal, a WPA2-related signal, a digital signature, an IBE-related signal, or a biometrics-related signal.

After performing the authentication of the corresponding one of the IoT devices 200, 300, or 400; the hub 500 may update and store the access history and authentication history of the corresponding one of the IoT devices 200, 300, or 400 in operation S130. The hub 500 may also determine an authentication grade of the corresponding one of the IoT devices 200, 300, or 400 according to the access history and authentication history of the corresponding one of the IoT devices 200, 300, or 400 and the selected authentication technique.

After performing the authentication of the corresponding one of the IoT devices 200, 300, or 400; the hub 500 sends a request for access to the server 110 (e.g., a server access right) for the corresponding one of the IoT devices 200, 300, or 400 to the server 110 based on the pairing information of the corresponding one of the IoT devices 200, 300, or 400 in operation S140 and receives an approval of the access right from the server 110 in operation S150. Upon receiving the approval of the access right from the server 110, the hub 500 completes the pairing with the corresponding one of the IoT devices 200, 300, or 400 in operation S160; receives data from the corresponding one of the IoT devices 200, 300, or 400 in operation S170; and transmits the data to the server 110 to be registered in the server 110 in operation S180.

Operations S140 and S150 may be performed only to initially register the corresponding one of the IoT devices 200, 300, or 400 in the server 110. For example, once the corresponding one of the IoT devices 200, 300, or 400 is registered in the server 110, the hub 500 may transmit data from the corresponding one of the IoT devices 200, 300, or 400 to the server 110 as soon as receiving the data from the corresponding one of the IoT devices 200, 300, or 400 or according to a predetermined period or count without performing operations S150 and S160.

The hub 500 may process data from a plurality of IoT devices into a predetermined data format to generate a data sheet and may transmit the data sheet to the server 110 in operation S170. The data sheet may include data from a plurality of IoT devices and authentication information of the hub 500 as well.

According to an exemplary embodiment, the order of operations may be changed and at least two operations may be performed in parallel.

Figure 6:
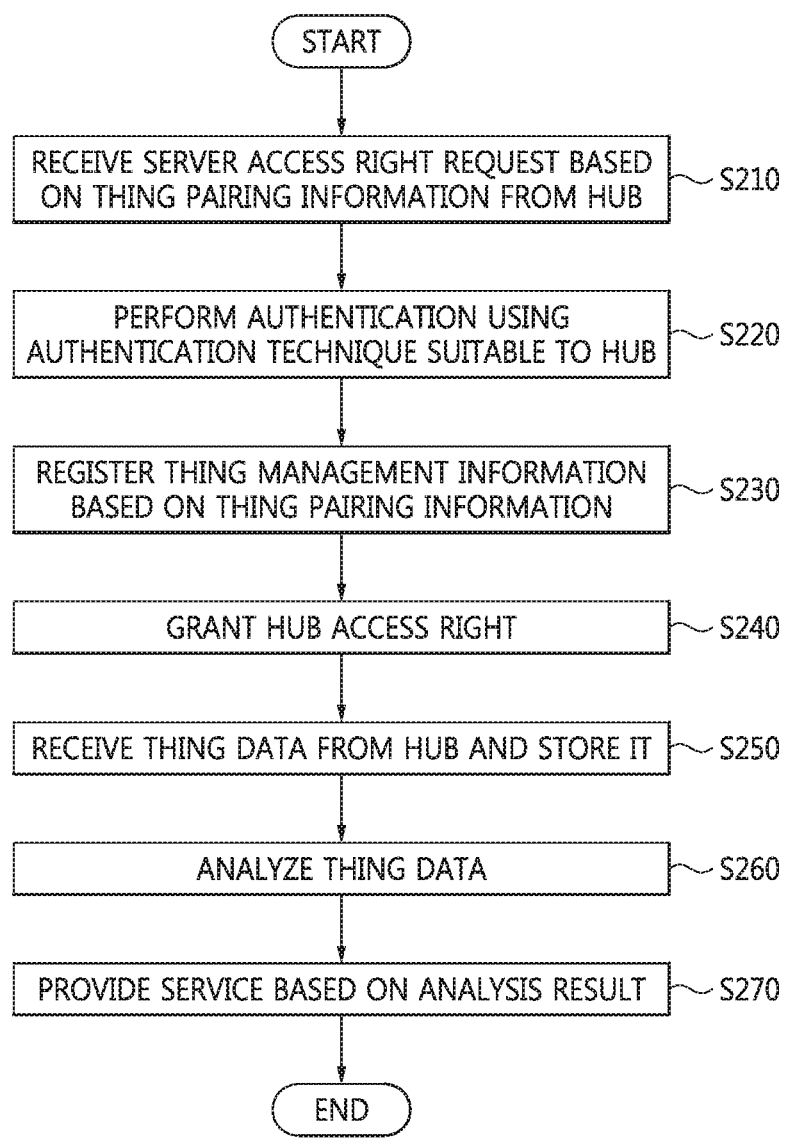
FIG. 6 is a flowchart of a method of operating a server according to an exemplary embodiment of the inventive concept.

FIG. 6 is a flowchart of a method of operating the server 110 according to an exemplary embodiment of the inventive concept. Referring to FIGS. 1 through 4 and FIG. 6, the server 110 receives a server access right request based on thing pairing information from the hub 500 in operation S210. The thing pairing information is the pairing information of one of the IoT devices 200, 300, or 400 that has sent a pairing request to the hub 500.

The server 110 authenticates the hub 500 using the thing pairing information and the authentication information of the hub 500 in operation S220. For example, the server 110 may perform authentication of the hub 500 using an authentication technique suitable to the hub 500 among the hub authentication techniques 121-1 through 121-3 based on the authentication information of the hub 500 in operation S220.

Thereafter, the server 110 registers management information of the corresponding one of the IoT devices 200, 300, or 400 based on the thing pairing information in operation S230 and grants the hub 500 the access right in operation S240. Thereafter, the server 110 receives data of a thing granted the access right from the hub 500 and stores the data in operation S250. The server (e.g., 110) analyzes the thing data that has been stored to generate an analysis result in operation S260 and provides or supports a service based on the analysis result in operation S270.

The order of operations may be changed in different embodiments and at least two operations may be performed in parallel.

Figure 7:
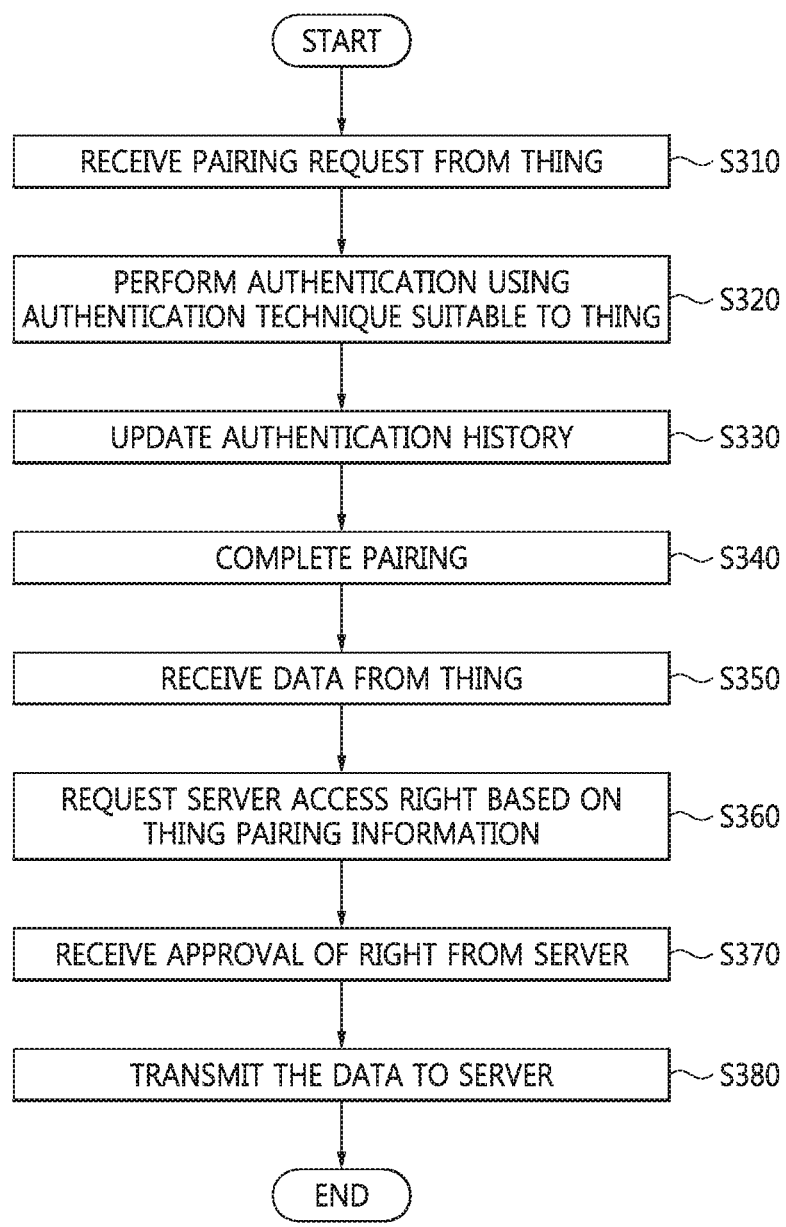
FIG. 7 is a flowchart of a method of operating a hub according to an exemplary embodiment of the inventive concept.

FIG. 7 is a flowchart of a method of operating the hub 500 according to an exemplary embodiment of the inventive concept. The embodiments illustrated in FIG. 7 are similar to those illustrated in FIG. 5, and therefore, the description will be focused on the differences therebetween to avoid redundancy. Referring to FIGS. 1 through 3 and FIGS. 5 and 7, operations S310, S320, and S330 are the same as operations S110, S120, and S130, respectively.

In the embodiment illustrated in FIG. 7, after performing the authentication of the corresponding one of the IoT devices 200, 300, or 400 in operation S320, the hub 500 updates and stores the access history and authentication history of the corresponding one of the IoT devices 200, 300, or 400 in operation S330 and completes the pairing with the corresponding one of the IoT devices 200, 300, or 400 (e.g., from the paired device) in operation S340. Thereafter the hub 500 receives data from the corresponding one of the IoT devices 200, 300, or 400 (e.g., from the pair device) in operation S350. The hub 500 may store the pairing information of the corresponding one of the IoT devices 200, 300, or 400 and the received data (e.g., the data received from the pair device) in the memory 530.

The hub 500 sends a request for access to the server 110 (e.g., a server access right) for the corresponding one of the IoT devices 200, 300, or 400 to the server 110 based on the pairing information of the corresponding one of the IoT devices 200, 300, or 400 in operation S360, receives an approval of the access right from the server 110 in operation S370, and transmits the data of the corresponding one of the IoT devices 200, 300, or 400 stored in the memory 530 to the server 110 to be registered in the server 110 in operation S380.

According to at least embodiment of the inventive concept, even before receiving the approval of the access right for the corresponding one of the IoT devices 200, 300, or 400 from the server 110, the hub 500 authenticates the corresponding one of the IoT devices 200, 300, or 400, performs the pairing with the corresponding one of the IoT devices 200, 300, or 400, receives data from the corresponding one of the IoT devices 200, 300, or 400, and stores the data. Thereafter, when the access right of the corresponding one of the IoT devices 200, 300, or 400 is approved by the server 110, the hub 500 transmits the data of the corresponding one of the IoT devices 200, 300, or 400 to the server 110.

The hub 500 may process data from a plurality of IoT devices into a predetermined data format to generate a data sheet and may transmit the data sheet to the server 110. The data sheet may include data from a plurality of IoT devices and authentication information of the hub 500 as well.

The order of operations may be changed in different embodiments and at least two operations may be performed in parallel.

Figure 8:
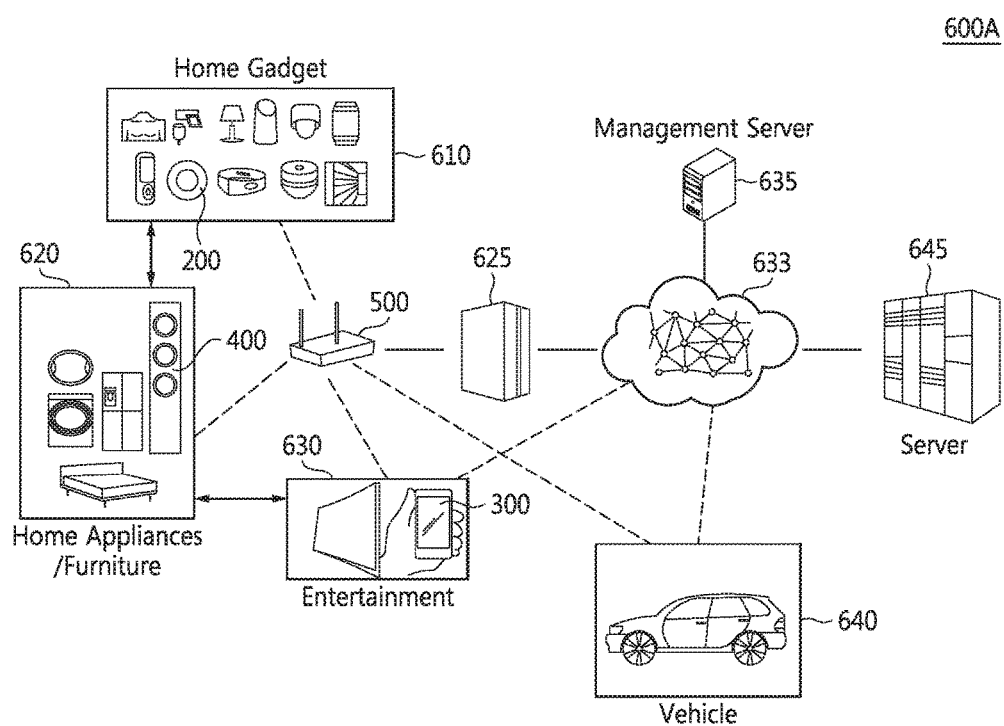
FIG. 8 is a block diagram of a data processing system including the hub illustrated in FIG. 1 according to an exemplary embodiment of the inventive concept.

FIG. 8 is a block diagram of a data processing system 600A including the hub 500 illustrated in FIG. 1 according to an exemplary embodiment of the inventive concept.

Referring to FIGS. 1 through 8, the data processing system 600A may include the hub 500 and IoT devices 610, 620, 630, and 640.

It is assumed that the structure of the IoT devices 610 is the same as or similar to that of the first IoT device 200, the structure of the IoT devices 630 is the same as or similar to that of the second IoT device 300, and the structure of the IoT devices 620 and 640 is the same as or similar to that of the third IoT device 400.

An IoT or the data processing system 600A may refer to a network among IoT devices that uses wired and/or wireless communication. Accordingly, an IoT here may be referred to as an IoT network system, a ubiquitous sensor network (USN) communication system, a machine type communication (MTC) system, a machine-oriented communication (MOC) system, a machine-to-machine (M2M) communication system, or a device-to-device (D2D) communication system.

Here, an IoT network system may include elements, such as, an IoT device, the hub 500, an access point, a gateway, a communication network, and/or a server. However, these elements are defined just to explain the IoT network system and the scope of the IoT network system is not limited to these elements. In an embodiment, the gateway is a piece of networking hardware used to exchange data between two different communication protocols.

The IoT network system may use a user datagram protocol (UDP), a transmission protocol like a transmission control protocol (TCP), an IPv6 low-power wireless personal area networks (6LoWPAN) protocol, An IPv6 internet routing protocol, a constrained application protocol (CoAP), a hypertext transfer protocol (HTTP), a message queue telemetry transport (MQTT), or an MQTT for sensors networks (MQTT-S) for exchange (or communication) of information among at least two elements therewithin.

When the IoT network system is implemented as a wireless sensor network (WSN), each of the IoT devices 200, 300, 400, 500, 610, 620, 630, and 640 may be used as a sink node or a sensor node. The sink node is also called a base station and acts as a gateway connecting the WSN with an external network (e.g., an internet). The sink node may assign a task to the sensor node and gather events sensed by the sensor node. The sensor node is a node within the WSN and may process and gather sensory information. The sensor node may communicate with other nodes in the WSN.

The IoT devices 200, 300, 400, 500, 610, 620, 630, and 640 may include an active IoT device which operates using its own power and a passive IoT device which operates using wireless power transferred from an outside source. The active IoT device may include a refrigerator, an air conditioner, a telephone, or an automobile (e.g., or a device incorporated into the automobile). The passive IoT device may include an RFID tag or an NFC tag. However, when an RFID tag or an NFC tag includes a battery, the RFID or NFC tag may be classified as an active IoT device.

The IoT devices 200, 300, 400, 500, 610, 620, 630, and 640 may include a passive communication interface such as a two-dimensional barcode, a three-dimensional barcode, a quick response (QR) code, an RFID tag, or an NFC tag. The IoT devices 200, 300, 400, 500, 610, 620, 630, and 640 may also include an active communication interface such as a modem or a transceiver.

At least one of the IoT devices 200, 300, 400, 610, 620, 630, and 640 may transmit and receive control information and/or data through a wired or wireless communication interface. The wired or wireless communication interface may be an example of an accessible interface.

The hub 500 in the IoT network system 600A may function as an access point. The IoT devices 200, 300, 400, 610, 620, 630, and 640 may be connected to a communication network or other IoT devices through the hub 500.

Although the hub 500 is shown as an independent device in FIG. 8, the hub 500 may be embedded in one of the IoT devices 400, 610, 620, 630, and 640. For example, the hub 500 may be embedded in a television (TV or a smart TV) or a smart refrigerator. At this time, a user may be allowed to monitor or control at least one of the IoT devices 400, 610, 620, 630, and 640 connected to the hub 500 through a display of the TV or the smart refrigerator.

The hub 500 may be one of the IoT devices 400, 610, 620, 630, and 640. For example, a smart phone may be an IoT device functioning as the hub 500. For example, the smart phone may perform tethering.

The IoT network system 600A may also include a gateway 625. The gateway 625 may connect the hub 500, which functions as an access point, to an external communication network (e.g., an internet or a public switched network). Each of the IoT devices 200, 300, 400, 500, 610, 620, 630, and 640 may be connected to an external communication network through the gateway 625. In an exemplary embodiment, the hub 500 and the gateway 625 are implemented in a single device. Alternatively, the hub 500 may function as a first gateway and the gateway 625 may function as a second gateway.

One of the IoT devices 200, 300, 400, 500, 610, 620, 630, and 640 may function as the gateway 625. For example, a smart phone may be both an IoT device and the gateway 625. The smart phone may be connected to a mobile cellular network.

The IoT network system 600A may also include a gateway 625 and at least one communication network 633. The communication network 633 may include an internet and/or a public switched network, but the inventive concept is not limited thereto. The public switched network may include a mobile cellular network. The communication network 633 may be a communication channel which transfers information gathered by the IoT devices 610, 620, 630, and 640.

The IoT network system 600A may also include a management server 635 and/or a server 645 connected to the communication network 633. The communication network 633 may transmit a signal (or data) detected by at least one of the IoT devices 610, 620, 630, and 640 to the management server 635 and/or the server 645.

The management server 635 and/or the server 645 may store or analyze a signal received from the communication network 633. The management server 635 and/or the server 645 may perform the same operations as or similar operations to the server 110A illustrated in FIG. 4.

The management server 635 and/or the server 645 may transmit the analysis result to at least one of the IoT devices 610, 620, 630, and 640 via the communication network 633. For example, the management server 635 may manage the states of the hub 500, the gateway 625, the communication network 633, and/or each of the IoT devices 610, 620, 630, and 640.

The server 645 may receive and store data related with at least one of the IoT devices 610, 620, 630, and 640 and may analyze the stored data to generate an analysis result. The server 645 may transmit the analysis result to at least one of the IoT devices 610, 620, 630, and 640 or to a device (e.g., a smart phone) possessed by a user via the communication network 633.

For example, when one of the IoT devices 610, 620, 630, and 640 is a blood glucose monitoring IoT device which measures a user's blood glucose; the server 645, which stores a blood glucose limit preset by the user, may receive a measured blood glucose level from the glucose monitoring IoT device via the communication network 633. In an exemplary embodiment, the server 645 compares the blood glucose limit with the measured blood glucose level and transmits a warning signal to at least one of the IoT devices 610, 620, 630, and 640 or a user device via the communication network 633 when the measured blood glucose level is higher than the blood glucose limit.

Figure 9:
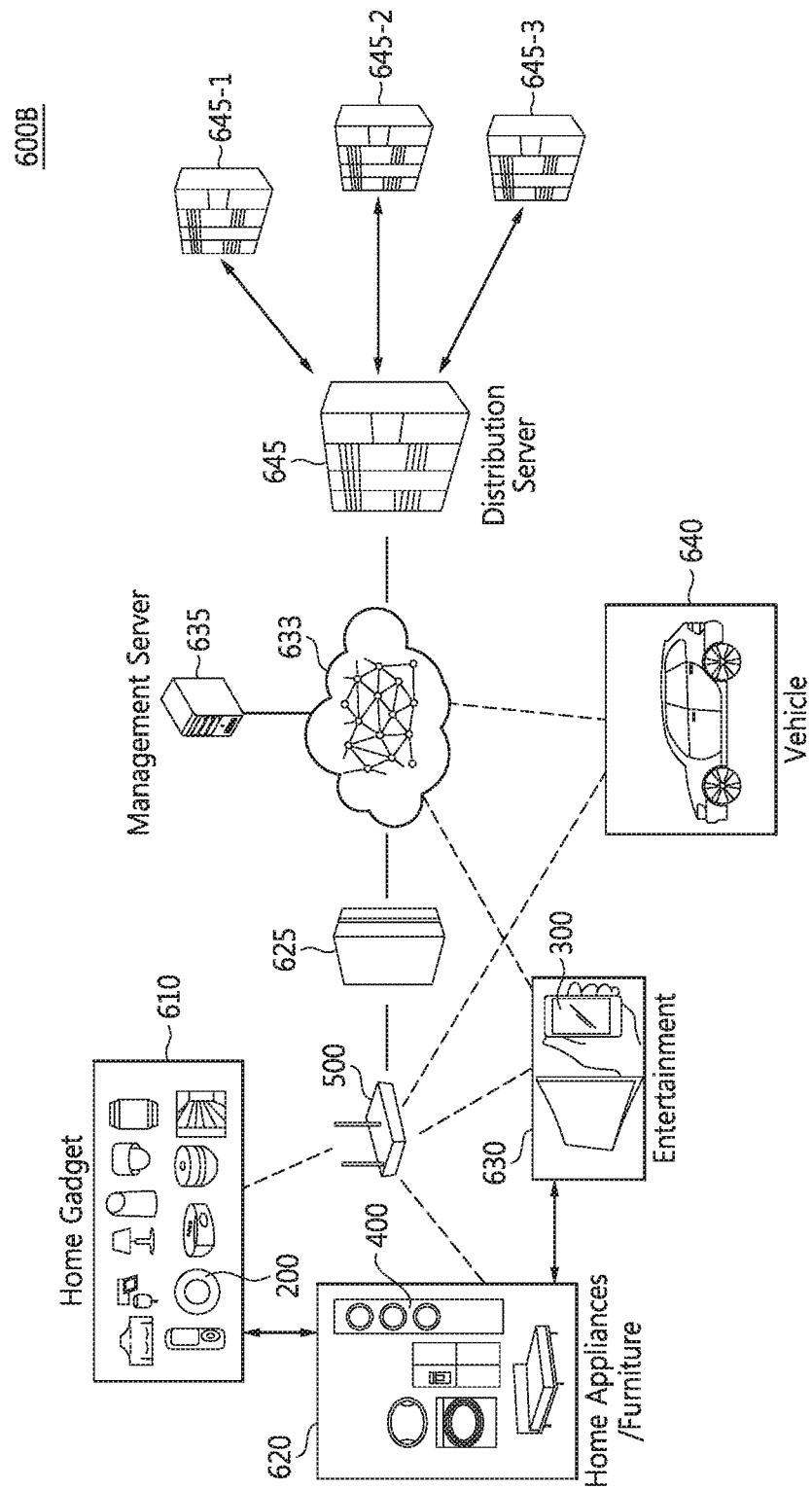
FIG. 9 is a block diagram of a data processing system including the hub illustrated in FIG. 1 according to an exemplary embodiment of the inventive concept.

FIG. 9 is a block diagram of a data processing system 600B including the hub 500 illustrated in FIG. 1 according to an exemplary embodiment of the inventive concept. Referring to FIGS. 1 through 9, the IoT network system 600B may include a hub 500, a smart phone 300, IoT devices 610, 620, 630, and 640, a gateway 625, a communication network 633, a management server 635, a distribution server 645, and a plurality of servers 645-1, 645-2, and 645-3.

Apart from the distribution server 645 and the servers 645-1, 645-2, and 645-3; the IoT network system 600B illustrated in FIG. 9 is the same as or similar to the IoT network system 600A illustrated in FIG. 8.

The distribution server 645 is connected with the servers 645-1, 645-2, and 645-3 and may distribute jobs to the servers 645-1, 645-2, and 645-3. The distribution server 645 may analyze a request transmitted from the communication network 633 through scheduling to generate an analysis result, may predict the amount of data and workload related with a job based on the analysis result, and may communicate with at least one of the servers 645-1, 645-2, and 645-3. In an embodiment, the distribution server 645 receives and analyzes state information from the servers 645-1, 645-2, and 645-3 to generate an analysis result and applies the analysis result to the scheduling. The overall performance of the IoT network system 600B may be enhanced through the scheduling of the distribution server 645.

Figure 10:
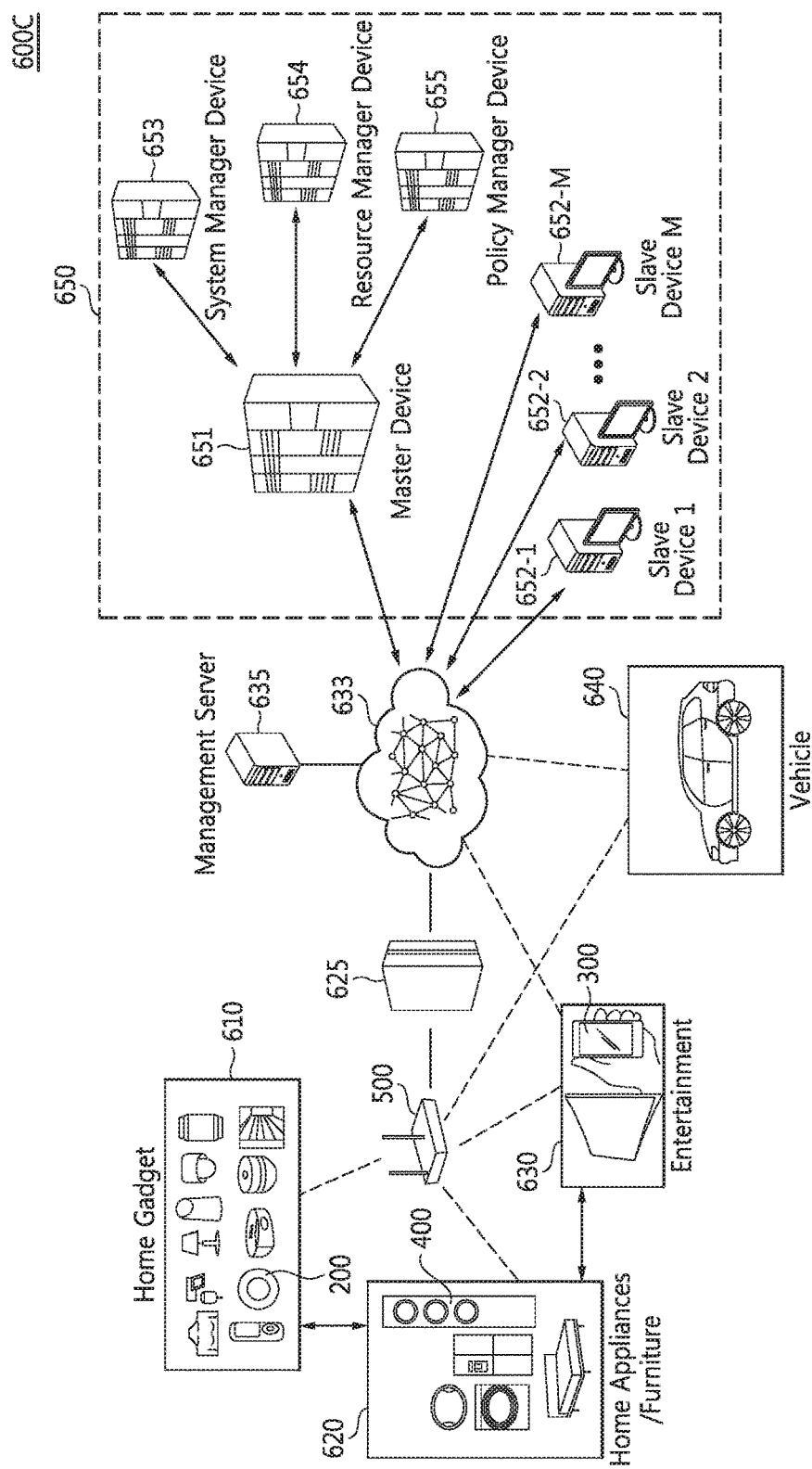
FIG. 10 is a block diagram of a data processing system including the hub illustrated in FIG. 1 according to an exemplary embodiment of the inventive concept.

FIG. 10 is a block diagram of a data processing system 600C including the hub 500 illustrated in FIG. 1 according to an exemplary embodiment of the inventive concept.

Referring to FIGS. 1 through 10, the IoT network system 600C may include a hub 500, a smart phone 300, IoT devices 610, 620, 630, and 640, a gateway 625, a communication network 633, a management server 635, and a distribution server system 650.

The distribution server system 650 may receive and store or analyze data from the communication network 633. The distribution server system 650 may send the stored data or the analyzed data to at least one of the elements 500, 625, 610, 620, 630, 625, and 640 included in the IoT network system 600C via the communication network 633.

In an exemplary embodiment, the distribution server system 650 may include a distributed computing system driven based on a distributed file system (DFS). For example, the distribution server system 650 may be driven based on at least one among various DFSs such as Hadoop DFS (HDFS), Google file system (GFS), Cloud store, Coda, network file system (NFS), and general parallel file system (GPFS), but the inventive concept is not limited to these examples.

In an exemplary embodiment, the distribution server system 650 includes a master device 651, slave devices 652-1 through 652-M (where M is a natural number of at least 3), a system manager device 653, a resource manager device 654, and a policy manager device 655. In an exemplary embodiment, less than 3 slave devices are present.

Each of the slave devices 652-1 through 652-M may store a data block. For example, data transmitted via the communication network 633 may be divided into data blocks by the master device 651. The data blocks may be stored in the slave devices 652-1 through 652-M in a distributed fashion. For example, when the distribution server system 650 is driven based on the HDFS, each of the slave devices 652-1 through 652-M may execute, as a data node, a task tracker to store at least one data block.

The master device 651 may divide data transmitted via the communication network 633 into data blocks. The master device 651 may provide each of the data blocks for at least one of the slave devices 652-1 through 652-M. For example, when the distribution server system 650 is driven based on the HDFS, the master device 651 may execute, as a name node, a job tracker to schedule the distribution of the data blocks. The master device 651 may manage distributed storage information indicating a stored position of each of the data blocks that have been distributed. The master device 651 may process a data store request and a data read request based on the distributed storage information.

The system manager device 653 may control and manage the overall operation of the distribution server system 650. The resource manager device 654 may manage the resource usage of each element included in the distribution server system 650. The policy manager device 655 may manage a policy on an access to each of the IoT devices 610, 620, 630, and 640 which are accessible via the communication network 633.

The master device 651, the slave devices 652-1 through 652-M, the system manager device 653, the resource manager device 654, and the policy manager device 655 each may include a universal computer like a personal computer (PC) and/or a dedicated computer like a workstation and each may include hardware modules for realizing a unique function. The master device 651, the slave devices 652-1 through 652-M, the system manager device 653, the resource manager device 654, and the policy manager device 655 each may perform a unique function by running software or firmware using a processor core.

As shown in FIG. 10, the master device 651 and the slave devices 652-1 through 652-M may share the communication network 633 with the IoT devices 610, 620, 630, and 640 and may transmit or receive data (or a data block) with one another via the communication network 633.

Figure 11:
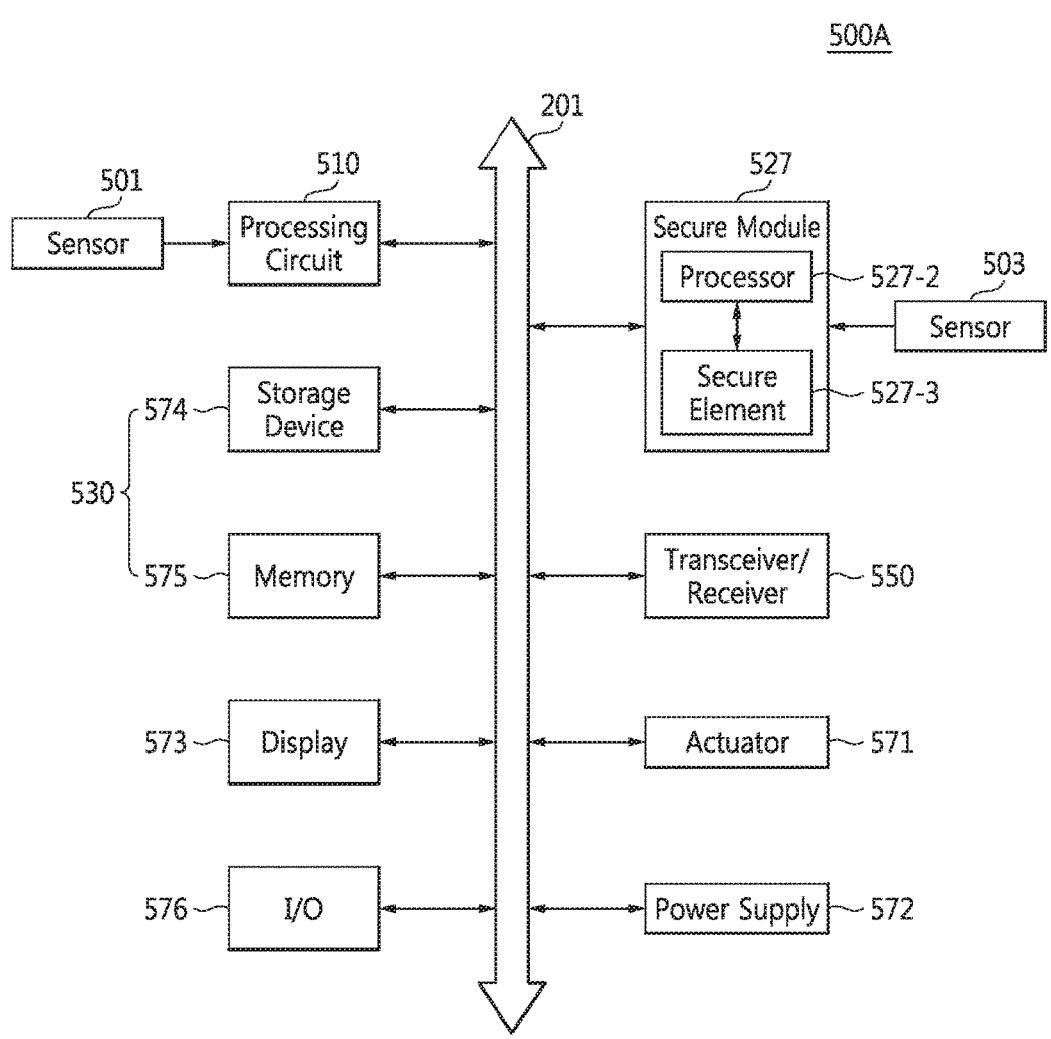
FIG. 11 is a block diagram of the hub illustrated in FIG. 1 according to an exemplary embodiment of the inventive concept.

FIG. 11 is a block diagram of an example 500A of the hub 500 illustrated in FIG. 1 according to an exemplary embodiment of the inventive concept. Referring to FIGS. 1 and 11, the hub 500A may include a bus 201, a first sensor 501, a second sensor 503, a display 573, a secure module 527, a processing circuit 510, a communication module 550, an actuator 571, a power supply 572, a storage device 574, a memory 575, and an input/output (I/O) device 576. The storage device 574 and the memory 575 may be collectively represented by the memory 530. The secure module 527 may be implemented as a hardware secure module, but the inventive concept is not limited thereto.

The elements 530, 527, 530, 550, 571, 572, 573, and 576 may transmit or receive a command and/or data with one another via the bus 201.

The first sensor 501 may transmit a detection signal to the processing circuit 510. The display 573 may display data processed by the hub 500A or may provide a user interface (UI) or a graphical user interface (GUI) for a user.

The processing circuit 510 may control the overall operation of the hub 500A. The processing circuit 510 may execute an application providing an internet browser, a game, a moving image (e.g., video), a song, etc.

The communication module 550 may perform communication as a communication interface using LAN, WLAN like Wi-Fi, WPAN like Bluetooth, wireless USB, ZigBee, NFC, RFID, power line communication (PLC), or mobile cellular network. The communication module 550 may be implemented as a transceiver or a receiver.

The storage device 574 may store a boot image for booting the hub 500A. For example, the storage device 574 may be implemented as an HDD, an SSD, an MMC, an eMMC, or a UFS.

The memory 575 may store data necessary for the operation of the hub 500A. For example, the memory 575 may include volatile memory and/or non-volatile memory.

The I/O device 576 may include an input device such as a touch pad, a keypad, or an input button, etc.; and an output device like a speaker.

The second sensor 503 may be a biosensor which detects biometric information. For example, the second sensor 503 may detect a fingerprint, an iris pattern, a vein pattern, a heart rate, or blood glucose to generate a detection result; may generate detection data corresponding to the detection result; and may provide the detection data to a processor 527-2 of the secure module 527. However, the second sensor 503 is not limited to the biosensor and may instead be a luminance sensor, an acoustic sensor (e.g., an acoustic wave sensor), or an acceleration sensor (e.g., an accelerometer).

The secure module 527 may include the processor 527-2 and a secure element 527-3. The secure module 527 may be formed in a single package and a bus connecting the processor 527-2 and the secure element 527-3 may be formed within the package. The secure element 527-3 may have a function of defending against external attacks and thus be used to safely store secure data, e.g., the authentication information 531. The processor 527-2 may transmit or receive data with the processing circuit 510.

The secure module 527 may include a secure element 527-3. The secure module 527 and the processing circuit 510 may generate a session key through mutual authentication. The secure module 527 may encrypt data using the session key and transmit the encrypted data to the processing circuit 510. The processing circuit 510 may decrypt the encrypted data using the session key to generate decrypted detection data. Accordingly, the security level of data transmission in the hub 500A is increased. For example, the secure element 527-3 may be formed in a single package together with the processing circuit 510.

The processor 527-2 of the secure module 527 may encrypt detection data output from the second sensor 503 and may store the encrypted data in the secure element 527-3. The processor 527-2 may control communication between the processing circuit 510 and the secure element 527-3.

The actuator 571 may include various elements necessary for the physical driving of the hub 500A. For example, the actuator 571 may include a motor driving circuit and a motor controlled by the motor driving circuit. The power supply 572 may provide an operating voltage necessary for the operation of the hub 500A. The power supply 572 may include a battery.

Figure 12:
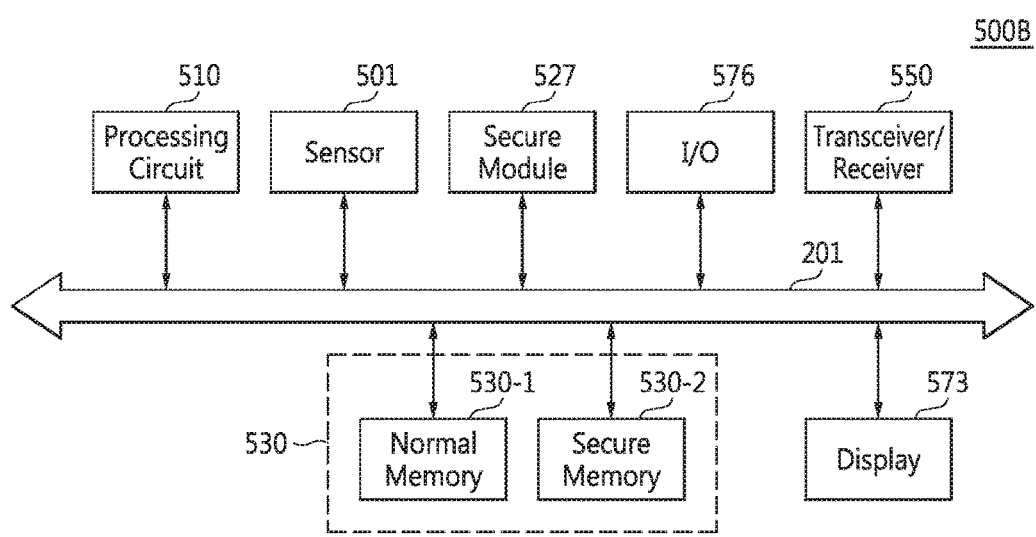
FIG. 12 is a block diagram of the hub illustrated in FIG. 1 according to an exemplary embodiment of the inventive concept.

FIG. 12 is a block diagram of an example 500B of the hub 500 illustrated in FIG. 1 according to an exemplary embodiment of the inventive concept.

Referring to FIGS. 1 and 12, the hub 500B may include a first sensor 501, a display 573, a bus 201, a secure module 527, a processing circuit 510, a communication module 550, an I/O device 576, and a memory 530. The memory 530 may include a normal memory 530-1 and a secure memory 530-2. Although the normal memory 530-1 is implemented in the memory 530 in the embodiment illustrated in FIG. 12, the normal memory 530-1 may be implemented in the secure memory 530-2 in other embodiments.

The elements 501, 510, 527, 530, 550, 573, and 576 may transmit or receive data with one another via the bus 201.

The processing circuit 510 may control the overall operation of the hub 500B.

The normal memory 530-1 may store data necessary for the operation of the hub 500B. The normal memory 530-1 may be formed of volatile memory or non-volatile memory which stores data that does not require security. The secure memory 530-2 may store data that requires security in the operation of the hub 500B. Although the normal memory 530-1 and the secure memory 530-2 are separated from each other in the embodiments illustrated in FIG. 12, the normal memory 530-1 and the secure memory 530-2 may be formed in a single physical memory. For example, the memory 530 including the normal memory 530-1 and the secure memory 530-2 may be removably coupled to the hub 500B.

The structure and functions of the secure module 527 illustrated in FIG. 12 may be the same as or similar to those of the secure module 527 illustrated in FIG. 11.

Figure 13:
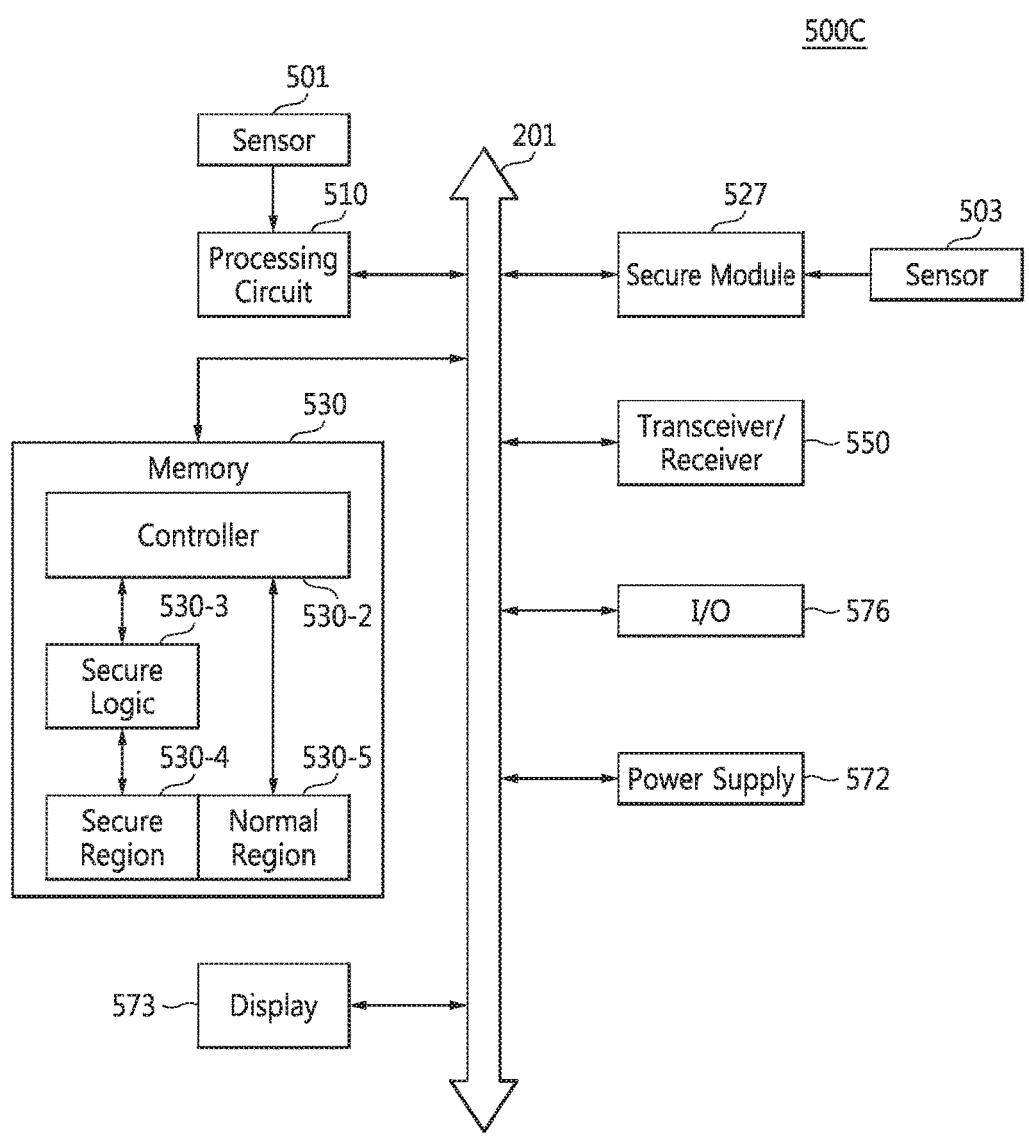
FIG. 13 is a block diagram of the hub illustrated in FIG. 1 according to an exemplary embodiment of the inventive concept.

FIG. 13 is a block diagram of an example 500C of the hub 500 illustrated in FIG. 1 according to an exemplary embodiment of the inventive concept.

Referring to FIGS. 1 and 13, the hub 500C may include a first sensor 501, a second sensor 503, a display 573, a bus 201, a secure module 527, a processing circuit 510, a communication module 550, a memory 530, a power supply 572, and an I/O device 576. The elements 510, 530, 573, 527, 550, 576, and 572 may transmit or receive data with one another via the bus 201.

The processing circuit 510 may control the overall operation of the hub 500C. The first sensor 501 may transmit a detection signal to the processing circuit 510. The second sensor 503 may be a biosensor which detects biometric information.

The structure and functions of the secure module 527 illustrated in FIG. 13 may be the same as or similar to those of the secure module 527 illustrated in FIG. 11.

The memory 530 may store a boot image for booting the hub 500C. For example, the memory 530 may be implemented as flash memory, SSD, eMMC, or UFS. The memory 530 may include a secure region 530-4 and a normal region 530-5. A controller 530-2 may directly access the normal region 530-5 but may access the secure region 530-4 via a secure logic circuit 530-3. In other words, the controller 530-2 can access the secure region 530-4 only via the secure logic circuit 530-3.

The secure module 527 may store data output from the second sensor 503 in the secure region 530-4 of the memory 530 through communication with the secure logic circuit 530-3 of the memory 530.

The power supply 572 may provide an operating voltage necessary for the operation of the hub 500C.

The I/O device 576 may include an input device such as a touch pad, a keypad, an input button, etc; and an output device like a speaker.

Figure 14:
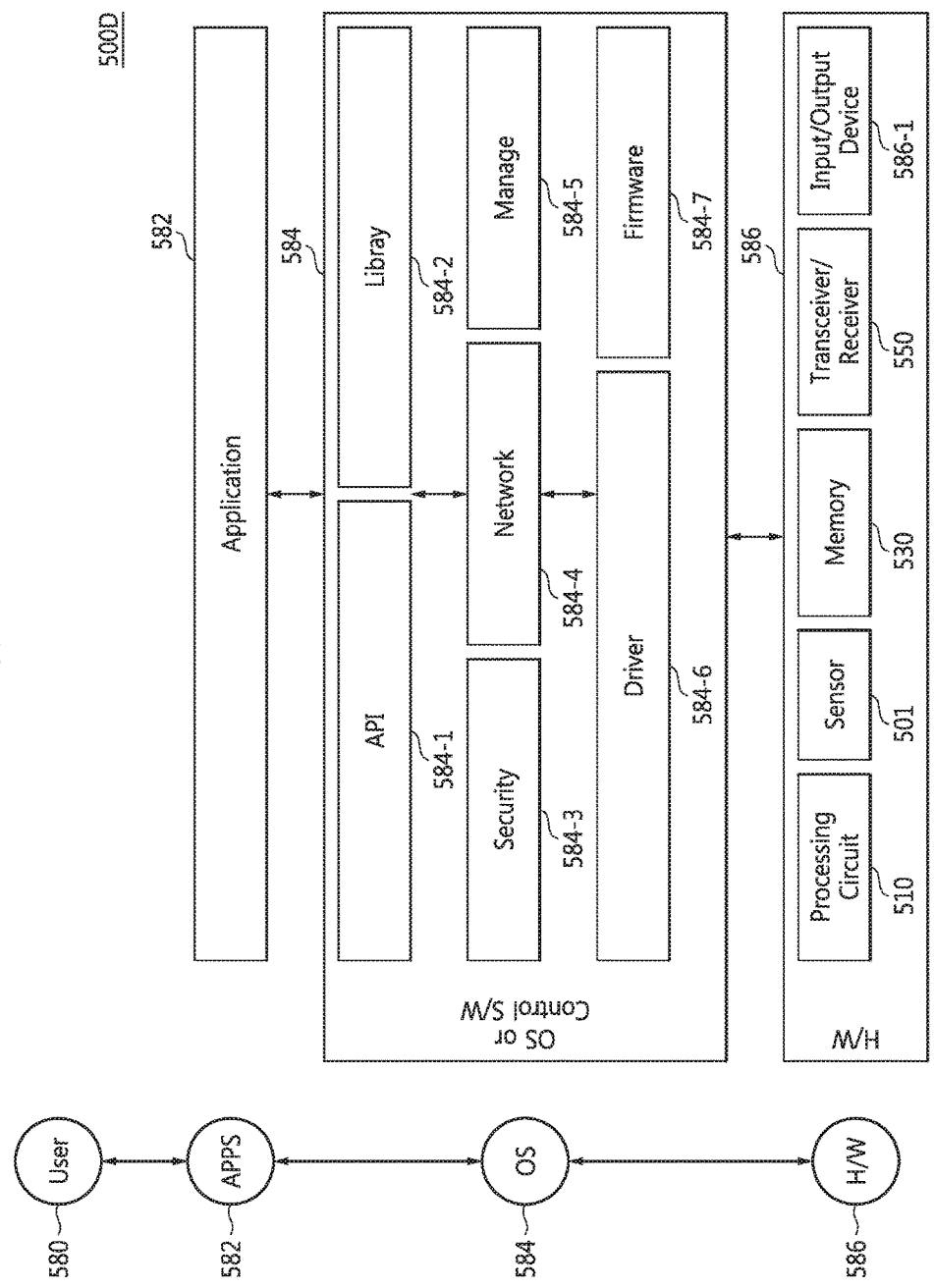
FIG. 14 is a block diagram of the hub illustrated in FIG. 1 according to an exemplary embodiment of the inventive concept.

FIG. 14 is a block diagram of an example 500D of the hub 500 illustrated in FIG. 1 according to an exemplary embodiment of the inventive concept.

Referring to FIGS. 1 and 14, the hub 500D may include a processing circuit 510, a sensor 501, a communication module 550, a memory 530, and an I/O device 586-1.

The hub 500D may also include an application 582 and an operating system (OS) 584. FIG. 14 shows the layers of a user 580, the application 582, the OS 584, and a hardware component 586.

The application 582 may refer to software and/or service which performs a particular function. The user 580 may refer to a subject or object using the application 582. The user 580 may communicate with the application 582 using a UI.

The application 582 may be created based on a service purpose and may interact with the user 580 through the UI corresponding to the service purpose. The application 582 may perform an operation requested by the user 580 and may call an application protocol interface (API) 584-1 and the content of a library 584-2 if necessary.

The API 584-1 and/or the library 584-2 may perform a macro operation for a particular function or, when communication with a lower layer is necessary, may provide interface for the communication. When the application 582 requests a lower layer to operate through the API 584-1 and/or the library 584-2, the API 584-1 and/or the library 584-2 may classify the request as a security 584-3, a network 584-4, or a manage 584-5.

The API 584-1 and/or the library 584-2 runs a necessary layer according to the request.

For example, when the API 584-1 requests a function related with the network 584-4, the API 584-1 may transmit a parameter necessary for the network 584-4 to the network 584-4 and may call the relevant function. At this time, the network 584-4 may communicate with a relevant lower layer to perform a requested task. When there is no lower layer, the API 584-1 and/or the library 584-2 may perform the corresponding task by itself.

A driver 584-6 may manage the hardware component 586 and monitor the state of the hardware component 586. The driver 584-6 may receive a classified request from an upper layer and may deliver the request to the layer of the hardware component 586.

When the driver 584-6 requests the layer of the hardware component 586 to perform a task, firmware 584-7 may convert the request so that the layer of the hardware component 586 can accept the request. The firmware 584-7 which transmits the converted request to the hardware component 586 may be included in the driver 584-6 or be executed by the hardware component 586.

The hub 500D may include the API 584-1, the driver 584-6, and the firmware 584-7 and may be equipped with an OS that manages these elements 584-1, 584-6, and 584-7. The OS may be stored in the memory 530 in a form of control command codes and data. When the hub 500D is a low-price product, the hub 500D may include control software instead of the OS since the size of the memory 530 is small.

The hardware component 586 may execute requests (or commands) received from the driver 584-6 and/or the firmware 584-7 in order or out of order and may store the results of executing the requests in an internal register (not shown) of the hardware component 586 or in the memory 530. The results that have been stored may be returned to the driver 584-6 and/or the firmware 584-7.

The hardware component 586 may generate an interrupt to request an upper layer to perform an operation. When the interrupt is generated, the interrupt is checked in the manage 584-5 of the OS 584 and then processed by the hardware component 586.

Figure 15:
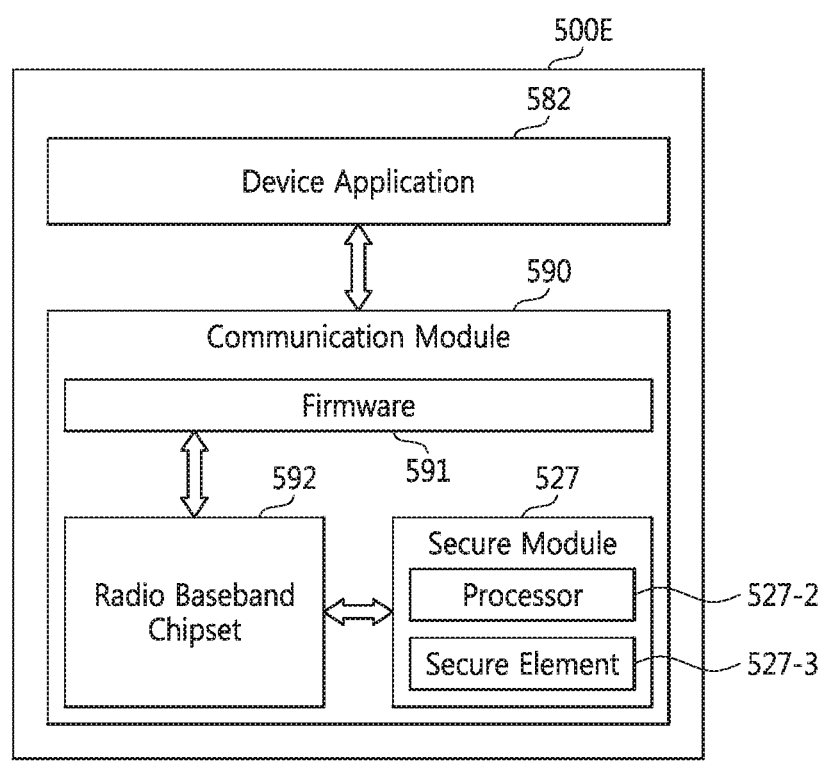
FIG. 15 is a block diagram of the hub illustrated in FIG. 1 according to an exemplary embodiment of the inventive concept.

FIG. 15 is a block diagram of an example 500E of the hub 500 illustrated in FIG. 1 according to an exemplary embodiment of the inventive concept.

Referring to FIGS. 1 and 15, the hub 500E may include the device application 582 and a communication module 590. The communication module 590 may include firmware 591, a radio baseband chipset 592, and a secure module 527.

The device application 582, as a software component, may control the communication module 590 and may be executed by a CPU of the hub 500E. The communication module 590 may perform communication via LAN, WLAN like Wi-Fi, WPAN like Bluetooth, wireless USB, ZigBee, NFC, RFID, PLC, or mobile cellular network. For example, the communication module 590 may be the communication module 550.

The firmware 591 may provide the device application 582 and application programming interface (API) and may control the radio baseband chipset 592 according to the control of the device application 582. The radio baseband chipset 592 may provide connectivity for a wireless communication network. The secure module 527 may include the processor 527-2 and the secure element 527-3. The secure module 527 may authenticate the hub 500E in order to connect to the wireless communication network and to access a wireless network service. For example, the secure module 527 may be implemented as an eMMC, but the inventive concept is not limited thereto.

Figure 16:
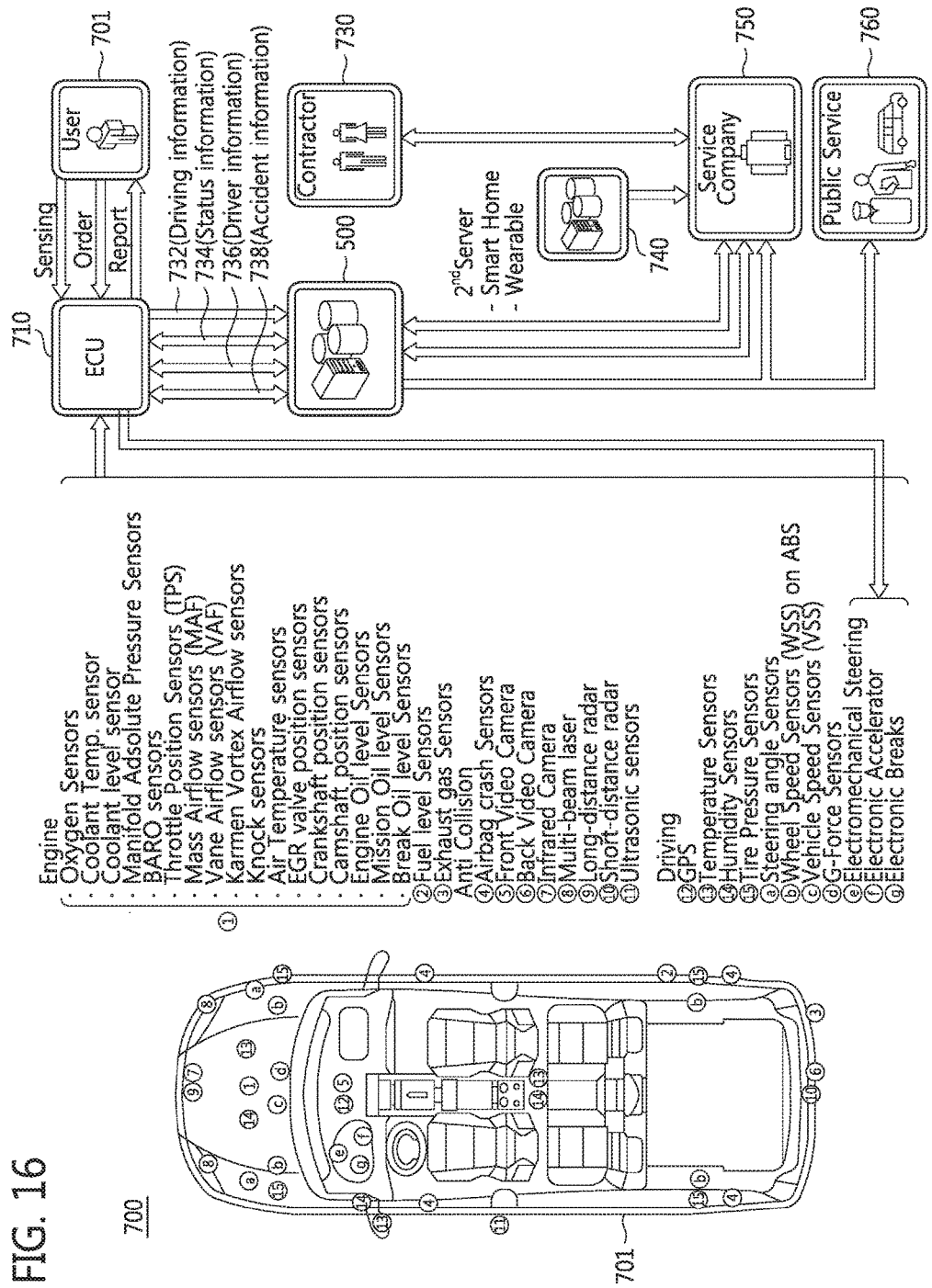
FIG. 16 is a block diagram of a data processing system including the hub illustrated in FIG. 1 according to an exemplary embodiment of the inventive concept.

FIG. 16 is a block diagram of a data processing system 700 including the hub 500 illustrated in FIG. 1 according to an exemplary embodiment of the inventive concept.

Referring to FIGS. 1 through 7 and FIG. 16, the IoT network system 700 represents a usage scenario of vehicle management, collision prevention, vehicle driving service, etc.

Figure 17:
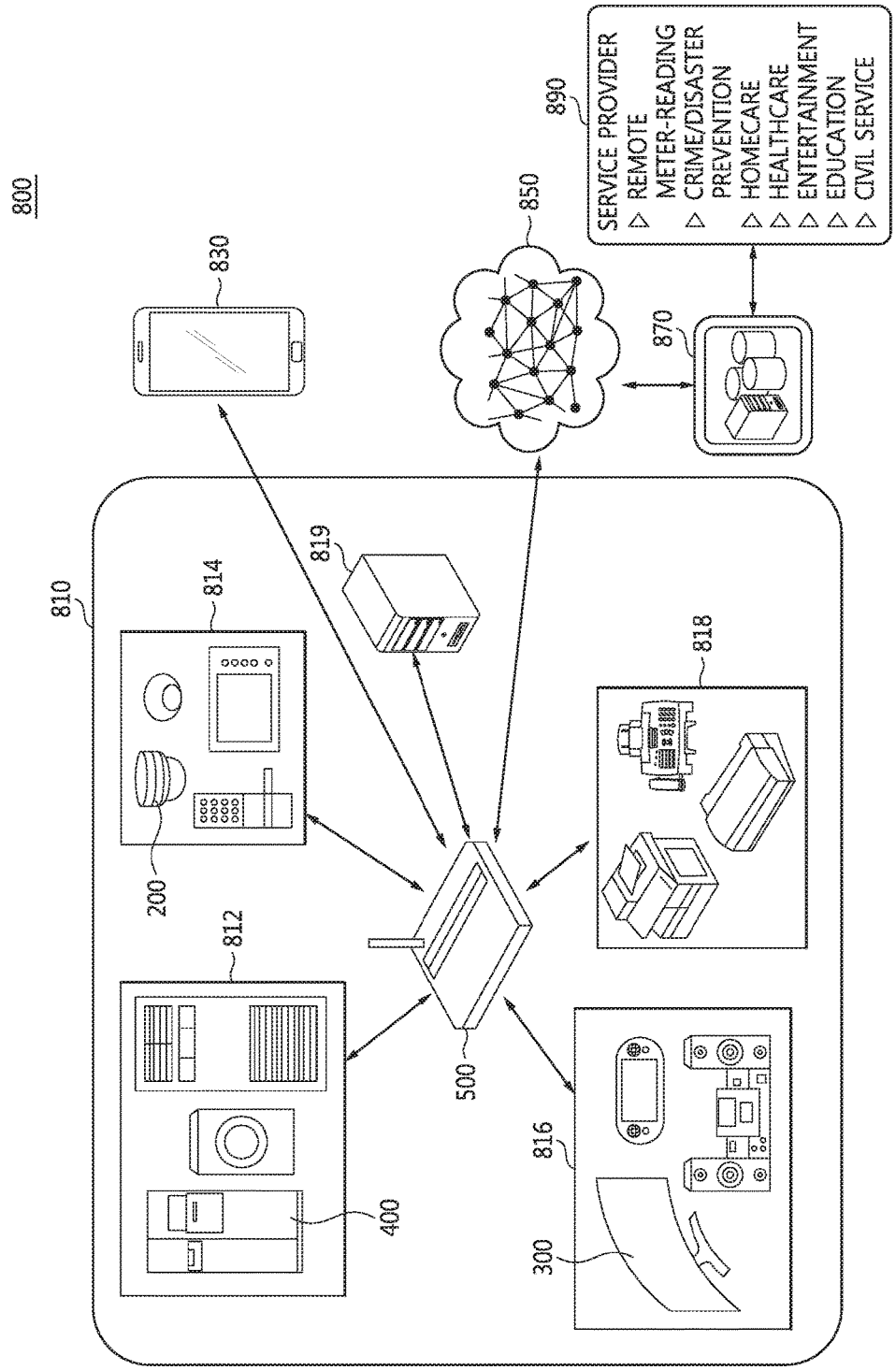
FIG. 17 is a block diagram of a data processing system including the hub illustrated in FIG. 1 according to an exemplary embodiment of the inventive concept.

Referring to FIG. 17, the IoT network system 700 includes a vehicle 701 including sensors. The IoT network system 700 may also include an engine control unit (ECU) 710, a hub 500, and at least one service provider 750 and/or 760.

The sensors may include an engine unit sensor ①, collision prevention sensors ④ through ⑪, and vehicle driving sensors ⑫ through ⑮ and ⓐ through ⓖ. The sensors may also include a fuel level sensor ② and/or an exhaust gas sensor ③.

The ECU 710 may gather driving information 732 output from the sensors and may transmit the driving information 732 to the hub 500 via a communication network. The hub 500 may perform the function of a data server. In an embodiment, the hub 500 is embedded in the data server.

The ECU 710 and the hub 500 may transmit or receive vehicle status information 734, driver information 736, and/or accident history information 738 with each other. Although the hub 500 is formed outside the ECU 710 in the embodiment illustrated in FIG. 16, the hub 500 may be formed inside the ECU 710 in other embodiments. The hub 500 may transmit information from the ECU 710 to a server of the service company 750.

The server of the service company 750 may provide a user's smart phone information obtained by analyzing the vehicle 701 with reference to the vehicle status information 734, the driver information 736, and/or the accident information 738 stored in the hub 500. For example, Services provided by the service company 750 may include information about accidents on the roads, a guide to the fast route, notification of accident handling, accident claim value calculation information, human-error rate estimation information, and/or emergency rescue service.

The server of the service company 750 may share vehicle-related information output from the hub 500 with a user 730 who has subscribed to the service. The user 730 may make a contract with the service company 750 based on the shared information.

The server of the service company 750 may receive a driver's personal information from a second server 740 and may activate an access control and service function for the vehicle 701 of the driver using the personal information. For example, the server of the service company 750 may receive NFC tag information stored in a user's wrist watch, compare the NFC tag information with NFC tag information stored in the second server 740, and unlock the door lock of the vehicle 701. The server of the service company 750 or the second server 740 may transmit the arrival information of the vehicle 701 to an IoT device installed at the user's home when the vehicle 701 arrives at the user's home.

A server of the public service provider 760 may send traffic information to an IoT device (e.g., a smart phone) of the driver of the vehicle 701 based on the accident history information 738 stored in the hub 500.

FIG. 17 is a block diagram of a data processing system 800 including the hub 500 illustrated in FIG. 1 according to an exemplary embodiment of the inventive concept.

Referring to FIGS. 1 through 7 and FIG. 17, the IoT network system 800 may include a user's smart phone 830 and a home network system 810. The home network system 810 may include IoT devices 200, 300, 400, 812, 814, 816, and 818. In an exemplary embodiment, the IoT network system 800 also includes a communication network 850, a server 870, and a service provider 890.

The home network system 810 may control various kinds of IoT devices in a building (e.g., a house, an apartment, or a high-rise) via a wired/wireless network and may share contents with the IoT devices. The home network system 810 may include a hub 500, IoT devices 812, 814, 816, and 818, and a home server 819.

The home appliance 812 may include a smart refrigerator (e.g., the third IoT device 400), a smart washing machine, an air conditioner, etc., but the inventive concept is not limited thereto. The security/safety equipment 814 may include a door lock, a closed circuit television (CCTV) (e.g., the first IoT device 200), an interphone, a window sensor, a fire detection sensor, an electric plug, etc, but the inventive concept is not limited thereto. The entertainment equipment 816 may include a smart TV (e.g., the second IoT device 300), an audio game machine, a computer, etc, but the inventive concept is not limited thereto. The office equipment 818 may include a printer, a projector, a copy machine, etc, but the inventive concept is not limited thereto.

Each of the elements 200, 300, 400, 812, 814, 816, and 818 may be an IoT device.

Each of the IoT devices 200, 300, 400, 812, 814, 816, and 818 may communicate with one another through the hub 500. For example, each of the IoT devices 200, 300, 400, 812, 814, 816, and 818 may transmit or receive detection data or control information with the hub 500.

The IoT devices 200, 300, 400, 812, 814, 816, and 818 may communicate (or be paired) with the hub 500 via a communication network. The home network system 810 may use a sensor network, an M2M network, an internet protocol (IP) based network, or a non-IP based network.

The home network system 810 may be implemented as a home phoneline networking alliance (PNA), IEEE1394, a USB, a programmable logic controller (PLC), Ethernet, infrared data association (IrDA), Bluetooth, Wi-Fi, WLAN, ultra wide band (UWB), ZigBee, wireless 1394, wireless USB, NFC, RFID, or a mobile cellular network.

The IoT devices 200, 300, 400, 812, 814, 816, and 818 may be connected to the communication network 850 through the hub 500 which functions as a home gateway. The hub 500 may convert a protocol between the home network system 810 and the communication network 850. The hub 500 may convert a protocol among various types of communication networks included in the home network system 810 and may connect the IoT devices 200, 300, 400, 812, 814, 816, and 818 with the home server 819.

For example, the home server 819 may be installed at home or in an apartment block. The home server 819 may store or analyze data output from the hub 500. The home server 819 may provide a service relevant to the analyzed information for at least one of the IoT devices 200, 300, 400, 812, 814, 816, and 818 or the user's smart phone 830 or may transmit the analyzed information to the communication network 850 through the hub 500.

The home server 819 may receive and store external contents through the hub 500, may process data, and may provide the processed data for at least one of the IoT devices 200, 300, 400, 812, 814, 816, and 818 or the user's smart phone 830.

For example, the home server 819 may store I/O data transmitted from the security/safety equipment 814 or may provide an automatic security service or power management service for the IoT devices 812, 814, 816, and 818 based on the I/O data.

When each of the IoT devices 812, 814, 816, and 818 includes a sensor for sensing luminance, humidity, or contamination; the home server 819 may analyze data output from each IoT device 812, 814, 816, or 818 including the sensor to generate an analysis result and may provide an environment control service according to the analysis result or send the analysis result to the user's smart phone 830.

The communication network 850 may include an internet and/or or a public communication network. The public communication network may include a mobile cellular network. The communication network 850 may be a communication channel which transmits information gathered by the IoT devices 200, 300, 400, 812, 814, 816, and 818 of the home network system 810.

The server 870 may store or analyze the gathered information and may generate service information related with the analysis result or may provide the stored or analyzed information for the service provider 890 and/or the user's smart phone 830.

The service provider 890 may analyze gathered information and may provide various services for a user according to the analysis result. The service provider 890 may provide a service, such as remote meter-reading, crime/disaster prevention, homecare, healthcare, entertainment, education, civil service, etc., for at least one of the IoT devices 200, 300, 400, 812, 814, 816, and 818 or the user's smart phone 830.

For example, the service provider 890 may receive information generated by at least one of the IoT devices 200, 300, 400, 812, 814, 816, and 818 from the server 870 and may provide a service of remotely reading information related with an energy resource (such as gas, water, or electricity) based on the received information. The service provider 890 may receive information generated by at least one of the IoT devices 200, 300, 400, 812, 814, 816, and 818 from the server 870; may generate energy resource-related information, indoor environment information, or user status information based on the received information; and may provide the generated information for at least one of the IoT devices 200, 300, 400, 812, 814, 816, and 818 or the user's smart phone 830.

The service provider 890 may provide an emergency rescue service for crime/disaster prevention based on security-related information, information about a fire outbreak, or safety-related information; or may send the information to the user's smart phone 830. The service provider 890 may also provide entertainment, education, administration service, etc. based on information received from at least one of the IoT devices 200, 300, 400, 812, 814, 816, and 818 and may provide a two-way service through at least one of the IoT devices 200, 300, 400, 812, 814, 816, and 818.

Figure 18:
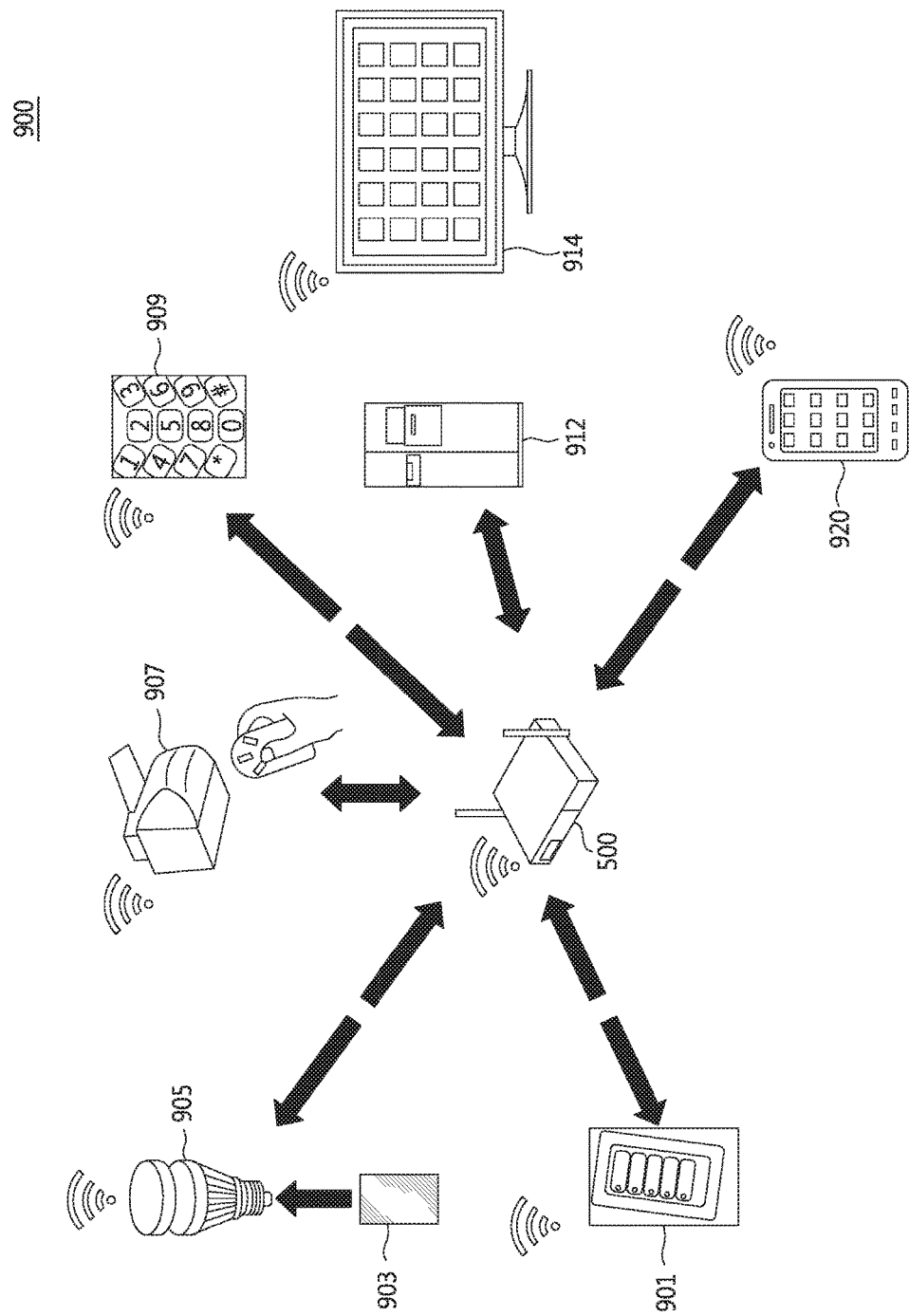
FIG. 18 is a block diagram of a data processing system including the hub illustrated in FIG. 1 according to an exemplary embodiment of the inventive concept.

FIG. 18 is a block diagram of a data processing system 900 including the hub 500 illustrated in FIG. 1 according to an exemplary embodiment of the inventive concept.

Referring to FIGS. 1 through 7 and FIG. 18, the IoT network system 900 may be a smart lighting-network system which controls a light emitting device (e.g., a light emitting diode (LED)). For example, the IoT network system 900 may be formed using various kinds of lighting fixtures and wired/wireless communication devices and may include a sensor, a controller, a communication unit, and a software component (e.g., software for network control and user maintenance and so on).

The IoT network system 900 may be used in a closed space defined as an inside of a building, such as a home or an office; and in an open space, such as a park or a street, as well. For example, the IoT network system 900 may be implemented to gather and/or process various kinds of information output from at least one sensor and may provide the information to a user's smart phone 920.

An LED lamp 905 included in the IoT network system 900 may receive information about a surrounding environment from the hub 500 or the user's smart phone 920 and may control its light based on the information. The LED lamp 905 may also check and control the operation state of at least one of IoT devices 901, 903, 907, 909, 912, and 914 included in the IoT network system 900 based on a communication protocol, e.g., a visible light communication protocol, of the LED lamp 905.

The IoT network system 900 may include the hub 500 which performs the function of a gateway processing data transferred according to different communication protocols, the user's smart phone 920 paired with the hub 500, the LED lamp 905 which can communicate with the hub 500 and includes a light emitting element, and the IoT devices 901, 907, 909, 912, and 914 which can communicate with the hub 500 according to various kinds of radio communication methods.

For example, the LED lamp 905 may include a lamp communication module 903, which may function as a communication module.

Each of the IoT devices 901, 907, 909, 912, and 914 may include the light switch 901, the garage door lock 907, the digital door lock 909, the refrigerator 912, and the TV 914.

In the IoT network system 900, the LED lamp 905 may check the operation status of at least one of the IoT devices 901, 907, 909, 912, and 914 using a radio communication network or may automatically adjust its own luminance according to a surrounding environment or circumstance. The LED lamp 905 may also control the operation of at least one of the IoT devices 901, 907, 909, 912, and 914 using LED Wi-Fi (LiFi) using visible rays emitted from the LED lamp 905.

The LED lamp 905 may automatically adjust its own luminance based on surrounding environment information transmitted from the hub 500 or the user's smart phone 920 through the lamp communication module 903 or based on surrounding environment information gathered from a sensor attached to the LED lamp 905.

For example, the brightness of the LED lamp 905 may be automatically adjusted according to the type of a program on the TV 914 or the brightness of the screen of the TV 914. For this operation, the LED lamp 905 may receive operation information of the TV 914 through the lamp communication module 903 wirelessly connected with the hub 500 or the user's smart phone 920. The lamp communication module 903 may be integrated with a sensor included in the LED lamp 905 and/or a controller included in the LED lamp 905 into a module.

When a predetermined period of time elapses after the digital door lock 909 is locked with no one at home, the LED lamp 905 can be turned off according to the control of the hub 500 or the user's smart phone 920. As a result, power waste is reduced. When a security mode is set according to the control of the hub 500 or the user's smart phone 920, the LED lamp 905 is maintained in an on-state even if the digital door lock 909 is locked with no one at home.

An on or an off of the LED lamp 905 may be controlled according to surrounding environment information gathered through sensors included in the IoT network system 900. The LED lamp 905 including at least one sensor, a storage device, and the lamp communication module 903 may keep a building secure or may detect an emergency. For example, when the LED lamp 905 includes a sensor for detecting smoke, $CO_2$, or temperature; the LED lamp 905 may detect fire and output a detection signal through an output unit or send the detection signal to the hub 500 or the user's smart phone 920.

Figure 19:
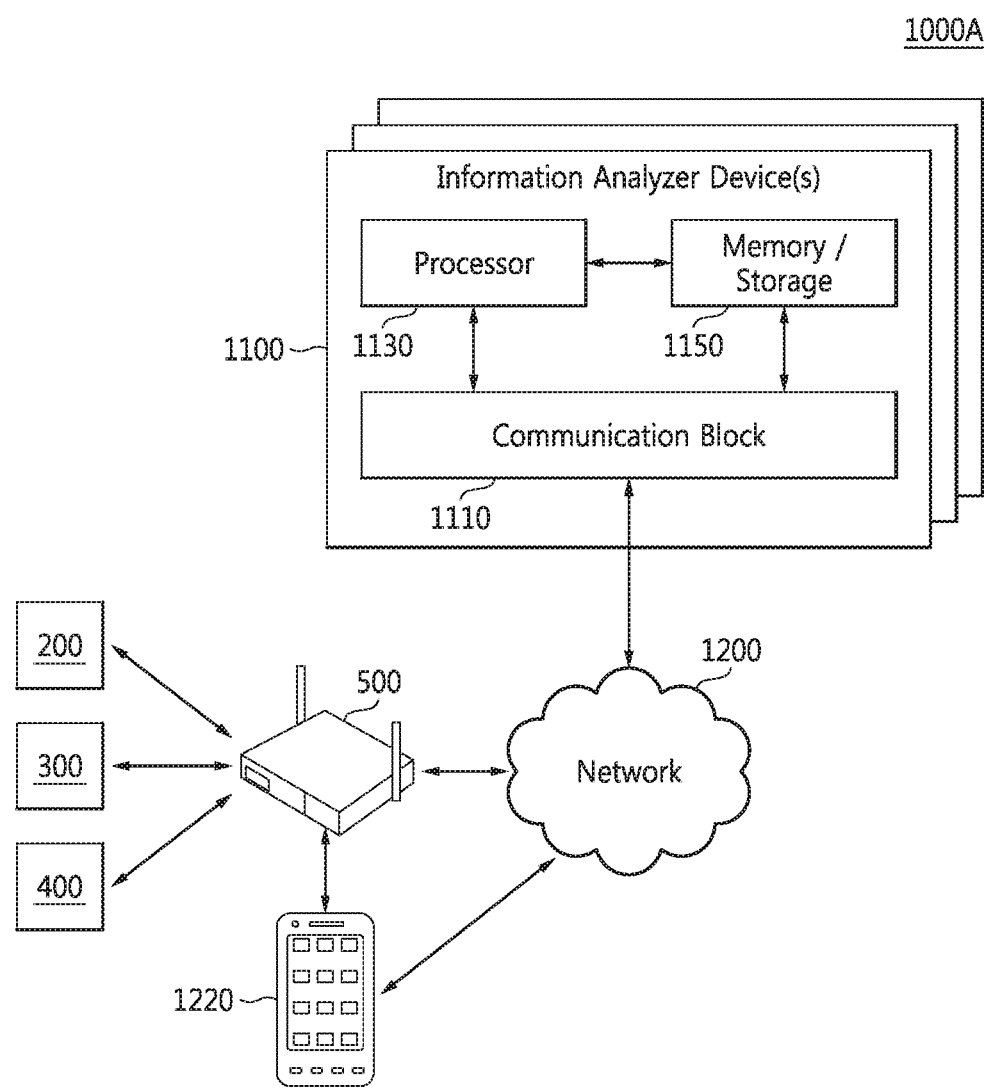
FIG. 19 is a block diagram of a data processing system including the hub illustrated in FIG. 1 according to an exemplary embodiment of the inventive concept.

FIG. 19 is a block diagram of a data processing system 1000A including the hub 500 illustrated in FIG. 1 according to an exemplary embodiment of the inventive concept. Referring to FIGS. 1 through 7 and FIG. 19, the IoT network system 1000A may be implemented as a service system providing services for users. The IoT network system 1000A may include the IoT devices 200, 300, and 400, the hub 500, a user's smart phone 1220, a communication network 1200, and an information analyzer device 1100.

The user's smart phone 1220 may be used by a subject who requests at least one service. The user may request a service using the smart phone 1220 and provided with the service.

The information analyzer device 1100 may analyze information to provide a service. The information analyzer device 1100 may analyze information necessary to achieve the goal of the service. The information analyzer device 1100 may include a universal computer like a PC and/or a dedicated computer like a workstation. The information analyzer device 1100 may include at least one computing device. For example, the information analyzer device 1100 may include a communication block 1110, a processor 1130, and a memory/storage 1150.

The communication block 1110 may communicate with the user's smart phone 1220 and/or the hub 500 via the communication network 1200. The communication block 1110 may be provided with information and data through the communication network 1200. The communication block 1110 may transmit the result necessary to provide the service to the user's smart phone 1220 through the communication network 1200. The processor 1130 may receive and process information and data to generate a processing result and output the processing result to provide the service. The memory/storage 1150 may store data that has been processed or will be processed by the processor 1130.

Figure 20:
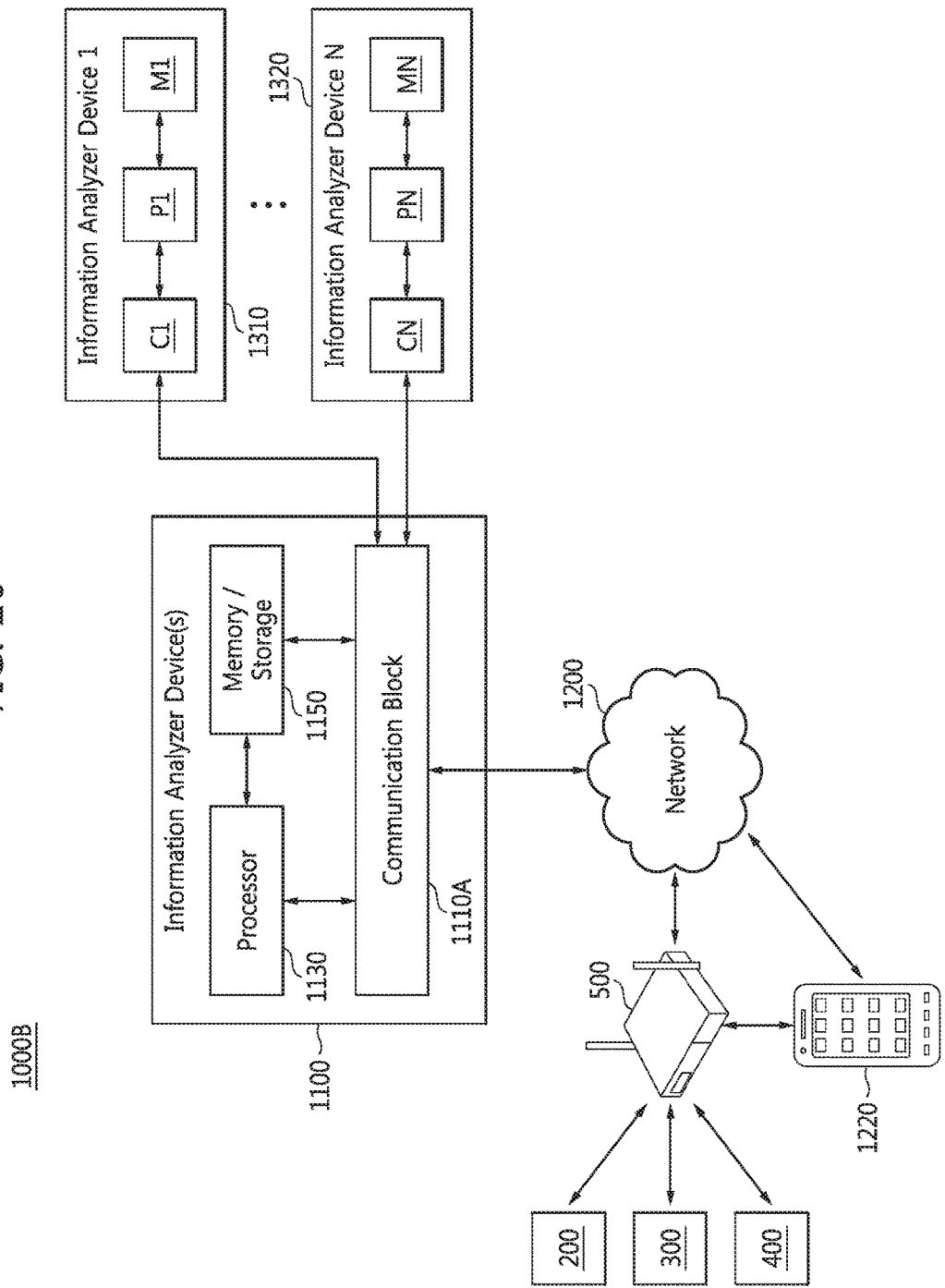
FIG. 20 is a block diagram of a data processing system including the hub illustrated in FIG. 1 according to an exemplary embodiment of the inventive concept.

FIG. 20 is a block diagram of a data processing system 1000B including the hub 500 illustrated in FIG. 1 according to an exemplary embodiment of the inventive concept. Referring to FIGS. 1 through 7 and FIG. 20, the IoT network system 1000B may include the IoT devices 200, 300, and 400, the hub 500, the user's smart phone 1220, the communication network 1200, the first information analyzer device 1100, the second information analyzer devices 1310 through 1320. Apart from the second information analyzer devices 1310 through 1320, the IoT network system 1000B illustrated in FIG. 20 is the same as or similar to the IoT network system 1000A illustrated in FIG. 19.

While the IoT network system 1000A illustrated in FIG. 19 includes one information analyzer device 1100, the IoT network system 1000B illustrated in FIG. 20 may also include the second information analyzer devices 1310 through 1320. For example, the information analyzer device 1310 may include a communication block C1, a processor P1, and a memory/storage M1; and the information analyzer device 1320 may include a communication block CN, a processor PN, and a memory/storage MN.

The structure and operations of each of the second information analyzer devices 1310 through 1320 may be the same as or similar to those of the first information analyzer device 1100 illustrated in FIG. 20. Each of the second information analyzer devices 1310 through 1320 may analyze information necessary to provide a service for a user.

The first information analyzer device 1100 may manage the operation of the second information analyzer devices 1310 through 1320. The first information analyzer device 1100 may distribute information or data subjected to analysis to the second information analyzer devices 1310 through 1320. Information necessary to provide a service for a user may be processed in the information analyzer devices 1100 and 1310 through 1320 in a distributed fashion.

The first information analyzer device 1100 may include a communication block 1110A, the processor 1130, and the memory/storage 1150. The first information analyzer device 1100 may communicate with the communication blocks C1 through CN of the respective second information analyzer devices 1310 through 1320 through the communication block 1110A. The first information analyzer device 1100 may also communicate with the other elements 1310 and 1320 through the communication block 1110A. The first information analyzer device 1100 may manage and schedule the information analyzing and/or processing performed by the second information analyzer devices 1310 through 1320 according to the operations of the processor 1130 and the memory/storage 1150.

As described above, according to at least one embodiment of the inventive concept, a semiconductor device manages an access right of an IoT device to a server on behalf of the IoT device. Accordingly, the semiconductor device (e.g., a hub) receives approval of the access right for an existing device or thing without secure authentication or with limited secure authentication, so that even data of the existing device with weak secure authentication can be registered in the server.

While the inventive concept has been particularly shown and described with reference to exemplary embodiments thereof, it will be understood by those of ordinary skill in the art that various changes in forms and details may be made therein without departing from the spirit and scope of the inventive concept.

What is claimed is:

1. A method of operating a hub which authenticates a plurality of internet of things (IoT) devices, the method comprising:
    determining, by the hub, a first security level of a first IoT device using a signal received in a pairing request from the first IoT device;
    selecting, by the hub, a first technique among a plurality of predetermined pairing authentication techniques according to the determined first security level;
    authenticating, by the hub, the first IoT device using the selected first technique;
    sending, by the hub, a request for an access right of the first IoT device to a server based on pairing information of the first IoT device; and
    transmitting, by the hub, data of the first IoT device to the server upon receiving approval of the access right of the first IoT device from the server.

2. The method of claim 1, wherein after the receiving the approval of the first access right, further comprising:
    completing, by the hub, pairing with the first IoT device; and
    receiving, by the hub, the data of the first IoT device from the first IoT device.

3. The method of claim 1, wherein before the receiving the approval of the first access right, further comprising:
    completing, by the hub, pairing with the first IoT device; and
    receiving, by the hub, the data of the first IoT device from the first IoT device.

4. The method of claim 1, wherein the signal comprises one of an Identifier ID, a password, a media access control (MAC) address, a Wi-Fi protected access (WPA)-related signal, a WPA2-related signal, a digital signature, an ID-based encryption (IBE)-related signal, and a biometrics-related signal.

5. The method of claim 1, further comprising:
    determining, by the hub, a second security level of a second IoT device using a signal received in a pairing request from the second IoT device;
    selecting, by the hub, a second technique among the predetermined pairing authentication techniques according to the determined second security level;
    authenticating, by the hub, the second IoT device using the second technique;
    sending, by the hub, a request for an access right of the second IoT device to the server based on pairing information of the second IoT device; and
    transmitting, by the hub, data of the second IoT device to the server upon receiving approval of the access right of the second IoT device.

6. The method of claim 5, wherein the data of the first IoT device and the data of the second IoT device are transmitted to the server together with authentication information of the hub.

7. The method of claim 5, wherein the transmitting the data of the second IoT device to the server comprises:
    generating, by the hub, a data sheet by processing the data of the first IoT device and the data of the second IoT device into a data format predefined between the server and the hub; and
    transmitting, by the hub, the data sheet to the server together with authentication information of the hub.

8. The method of claim 1, wherein the sending the request for the access right of the first IoT device to the server and receiving the approval of the access right of the first IoT device comprises:

transmitting, by the hub, the pairing information of the first IoT device and authentication information of the hub to the server; and selecting, by the server, a hub authentication technique from among predetermined hub authentication techniques using the authentication information of the hub;

authenticating, by the server, the hub using the selected hub authentication technique; and approving, by the server, the access right of the first IoT device.

9. The method of claim 8, further comprising:

updating and storing, by the hub, access history and authentication history of the first IoT device after authenticating the first IoT device; and determining, by the hub, an authentication grade of the first IoT device according to the access history and authentication history of the first IoT device and the first technique.

10. The method of claim 9, wherein the pairing information of the first IoT device comprises the authentication grade of the first IoT device.

11. A semiconductor device comprising:

a communication device configured to receive a pairing request from an internet of things (IoT) device; and a processor configured to communicate with the communication device, wherein the processor determines a security level of an IoT device using a signal received in a pairing request from the IoT device, selects an authentication technique from among a plurality of predetermined pairing authentication techniques according to the determined security level, authenticates the IoT device using the selected authentication technique, controls the communication device for pairing with the IoT device, sends a request for an access right of the IoT device to a server based on pairing information of the IoT device, and transmits data of the IoT device to the server upon receiving approval of the access right from the server.

12. The semiconductor device of claim 11, wherein the semiconductor device is a hub.

13. The semiconductor device of claim 11, wherein the processor transmits authentication information of the semiconductor device to the server together with the pairing information of the IoT device when sending the request for the access right; and the authentication information of the semiconductor device comprises one of a media access control (MAC) address, a digital signature, and an ID-based encryption (IBE)-related signal.

14. The semiconductor device of claim 13, wherein the processor generates a data sheet by processing data received from a plurality of IoT devices into a data format predefined between the server and the semiconductor device and transmits the data sheet to the server together with the authentication information of the semiconductor device.

15. The semiconductor device of claim 11, further comprising a hardware secure module configured to store the predetermined pairing authentication techniques, wherein the processor selects the authentication technique using the signal within the pairing request and the predetermined pairing authentication techniques stored in the hardware secure module.

16. The semiconductor device of claim 15, wherein the processor evaluates an authentication grade of the IoT device using the selected authentication technique and the pairing information of the IoT device comprises the authentication grade.

17. The semiconductor device of claim 15, wherein the signal comprises one of an identifier ID, a password, a media access control (MAC) address, a Wi-Fi protected access (WPA)-related signal, a WPA2-related signal, a digital signature, an ID-based encryption (IBE)-related signal, and a biometrics-related signal.

18. A semiconductor device comprising:

a wireless transceiver configured to receiving a pairing request from an internet of things IoT device; and a processing circuit configured to authenticate the IoT device using one of a plurality of pairing authentication techniques stored within the semiconductor device, send a request to a server for the IoT device to access the server upon authenticating the pairing request, and complete a pairing of the semiconductor device with the IoT device after receiving a response to the request from the server granting approval of the request.

19. The semiconductor device of claim 18, further comprising a secure hardware module configured to encrypt pairing information of the IoT device.

20. The semiconductor device of claim 19, wherein the processing circuit authenticates the request using the encrypted pairing information.

* * * * *